(12) United States Patent
Huynh et al.

(10) Patent No.: US 8,171,077 B2
(45) Date of Patent: May 1, 2012

(54) ADAPTIVE MEDIA MESSAGING, SUCH AS FOR RICH MEDIA MESSAGES INCORPORATING DIGITAL CONTENT

(75) Inventors: Hemingway Huynh, Salem, OR (US); Anh Huynh, Tigard, OR (US); Jeffrey Michael Farnsworth, Portland, OR (US)

(73) Assignee: Prolifiq Software Inc., Beaverton, OR (US)

( * ) Notice: Subject to any disclaimer, the term of this patent is extended or adjusted under 35 U.S.C. 154(b) by 0 days.

(21) Appl. No.: 13/152,928

(22) Filed: Jun. 3, 2011

(65) Prior Publication Data

US 2011/0302258 A1    Dec. 8, 2011

Related U.S. Application Data

(63) Continuation of application No. 10/611,698, filed on Jun. 30, 2003, now Pat. No. 7,966,374.

(60) Provisional application No. 60/393,176, filed on Jul. 1, 2002.

(51) Int. Cl.
*G06F 15/16*    (2006.01)

(52) U.S. Cl. ........ 709/203; 709/205; 709/219; 709/246; 719/313; 719/320; 719/328; 715/201; 715/205; 714/100; 725/95; 725/96

(58) Field of Classification Search .................. 709/203, 709/205, 246; 719/313, 320, 328; 715/201, 715/205; 714/100; 345/581
See application file for complete search history.

(56) References Cited

U.S. PATENT DOCUMENTS

| | | | | |
|---|---|---|---|---|
| 5,983,022 A * | 11/1999 | Watkins et al. | ............... | 717/144 |
| 6,014,689 A * | 1/2000 | Budge et al. | ................... | 709/206 |
| 6,023,714 A * | 2/2000 | Hill et al. | ...................... | 715/235 |
| 6,035,339 A * | 3/2000 | Agraharam et al. | .......... | 709/246 |
| 6,092,114 A * | 7/2000 | Shaffer et al. | ................. | 709/232 |
| 6,167,441 A * | 12/2000 | Himmel | ......................... | 709/217 |
| 6,182,094 B1 * | 1/2001 | Humpleman et al. | ........ | 715/234 |
| 6,212,564 B1 * | 4/2001 | Harter et al. | ...................... | 709/228 |
| 6,243,392 B1 * | 6/2001 | Uemura et al. | ............... | 370/465 |
| 6,247,050 B1 * | 6/2001 | Tso et al. | ...................... | 709/224 |
| 6,253,207 B1 * | 6/2001 | Malek et al. | .......................... | 1/1 |
| 6,279,041 B1 * | 8/2001 | Baber et al. | ................... | 709/232 |
| 6,292,554 B1 * | 9/2001 | Oden et al. | ...................... | 379/229 |
| 6,317,795 B1 * | 11/2001 | Malkin et al. | ................. | 709/246 |
| 6,345,279 B1 * | 2/2002 | Li et al. | ................................. | 1/1 |
| 6,345,298 B1 * | 2/2002 | Moriya | ......................... | 709/228 |
| 6,360,252 B1 * | 3/2002 | Rudy et al. | ..................... | 709/206 |
| 6,393,605 B1 * | 5/2002 | Loomans | ........................ | 717/121 |
| 6,470,378 B1 * | 10/2002 | Tracton et al. | ................. | 709/203 |
| 6,480,537 B1 * | 11/2002 | Agrawal et al. | ................ | 375/240 |
| 6,496,980 B1 * | 12/2002 | Tillman et al. | ................... | 725/90 |
| 6,563,912 B1 * | 5/2003 | Dorfman et al. | ............. | 379/88.13 |
| 6,594,699 B1 * | 7/2003 | Sahai et al. | ..................... | 709/228 |
| 6,625,460 B1 * | 9/2003 | Patil | .............................. | 455/466 |
| 6,643,684 B1 * | 11/2003 | Malkin et al. | .................. | 709/206 |
| 6,704,024 B2 * | 3/2004 | Robotham et al. | ............ | 345/581 |
| 6,704,396 B2 * | 3/2004 | Parolkar et al. | ............. | 379/88.17 |
| 6,738,803 B1 * | 5/2004 | Dodrill et al. | ................. | 709/218 |

(Continued)

*Primary Examiner* — Michael Won

(74) *Attorney, Agent, or Firm* — Schwabe Williamson & Wyatt

(57) ABSTRACT

A facility for presenting an adaptive message is described. The facility receives a message in the computer system. Based upon the contents of the received message, the facility tests two or more digital content capabilities of the computer system. The facility then selects one of a number of different digital content elements based upon the results of the testing. The facility presents the selected digital content element.

20 Claims, 20 Drawing Sheets

U.S. PATENT DOCUMENTS

| | | | |
|---|---|---|---|
| 6,742,043 B1* | 5/2004 | Moussa et al. | 709/232 |
| 6,760,916 B2* | 7/2004 | Holtz et al. | 725/34 |
| 6,763,377 B1* | 7/2004 | Belknap et al. | 709/223 |
| 6,792,575 B1* | 9/2004 | Samaniego et al. | 715/202 |
| 6,795,863 B1* | 9/2004 | Doty, Jr. | 709/231 |
| 6,829,633 B2* | 12/2004 | Gelfer et al. | 709/203 |
| 6,832,241 B2* | 12/2004 | Tracton et al. | 709/203 |
| 6,904,450 B1* | 6/2005 | King et al. | 709/203 |
| 6,906,818 B1* | 6/2005 | Makishima | 358/1.15 |
| 6,938,077 B2* | 8/2005 | Sanders | 709/219 |
| 6,961,754 B2* | 11/2005 | Christopoulos et al. | 709/204 |
| 6,970,602 B1* | 11/2005 | Smith et al. | 382/232 |
| 6,976,082 B1* | 12/2005 | Ostermann et al. | 709/231 |
| 6,978,418 B1* | 12/2005 | Bain et al. | 715/205 |
| 6,992,983 B1* | 1/2006 | Chatterjee | 370/232 |
| 6,996,618 B2* | 2/2006 | Apostolopoulos et al. | 709/227 |
| 7,003,794 B2* | 2/2006 | Arye | 725/100 |
| 7,024,485 B2* | 4/2006 | Dunning et al. | 709/232 |
| 7,051,084 B1* | 5/2006 | Hayton et al. | 709/219 |
| 7,061,928 B2* | 6/2006 | Giroti et al. | 370/422 |
| 7,228,343 B2* | 6/2007 | Sanders | 709/219 |
| 7,251,678 B2* | 7/2007 | Mori | 709/206 |
| 7,567,671 B2* | 7/2009 | Gupte | 380/239 |
| 7,707,317 B2* | 4/2010 | Huynh et al. | 709/246 |
| 7,755,786 B2* | 7/2010 | Foehr et al. | 358/1.15 |
| 7,770,200 B2* | 8/2010 | Brooks et al. | 725/95 |
| 7,802,286 B2* | 9/2010 | Brooks et al. | 725/96 |
| 7,966,374 B2* | 6/2011 | Huynh et al. | 709/206 |
| 2001/0016869 A1* | 8/2001 | Baumeister et al. | 709/203 |
| 2001/0034769 A1* | 10/2001 | Rast | 709/206 |
| 2001/0043516 A1* | 11/2001 | Gelfer et al. | 369/30.06 |
| 2001/0047517 A1* | 11/2001 | Christopoulos et al. | 725/87 |
| 2002/0016818 A1* | 2/2002 | Kirani et al. | 709/203 |
| 2002/0032754 A1* | 3/2002 | Logston et al. | 709/219 |
| 2002/0065925 A1* | 5/2002 | Kenyon et al. | 709/231 |
| 2002/0073217 A1* | 6/2002 | Ma et al. | 709/230 |
| 2003/0028647 A1* | 2/2003 | Grosu | 709/227 |
| 2003/0055925 A1* | 3/2003 | McAlinden | 709/221 |
| 2003/0093565 A1* | 5/2003 | Berger et al. | 709/246 |
| 2003/0097485 A1* | 5/2003 | Horvitz et al. | 709/313 |
| 2003/0110234 A1* | 6/2003 | Egli et al. | 709/217 |
| 2003/0110236 A1 | 6/2003 | Yang | |
| 2003/0154253 A1* | 8/2003 | Smith et al. | 709/206 |
| 2003/0161448 A1* | 8/2003 | Parolkar et al. | 379/88.17 |
| 2003/0200263 A1* | 10/2003 | Goldberg | 709/206 |
| 2003/0236892 A1* | 12/2003 | Coulombe | 709/228 |
| 2003/0236917 A1* | 12/2003 | Gibbs et al. | 709/248 |
| 2004/0083291 A1* | 4/2004 | Pessi et al. | 709/227 |
| 2004/0133640 A1* | 7/2004 | Yeager et al. | 709/204 |
| 2004/0225753 A1* | 11/2004 | Marriott et al. | 709/246 |
| 2005/0005022 A1* | 1/2005 | Taylor | 709/236 |
| 2005/0060381 A1* | 3/2005 | Huynh et al. | 709/206 |
| 2005/0076089 A1* | 4/2005 | Fonseca | 709/206 |
| 2005/0165913 A1 | 7/2005 | Coulombe | |
| 2005/0262206 A1* | 11/2005 | Weir et al. | 709/206 |
| 2007/0083810 A1* | 4/2007 | Scott et al. | 715/525 |
| 2007/0283048 A1* | 12/2007 | Theimer et al. | 709/246 |
| 2008/0114830 A1* | 5/2008 | Welingkar et al. | 709/203 |
| 2010/0235457 A1* | 9/2010 | Huynh et al. | 709/206 |

\* cited by examiner

ADAPTIVE MEDIA MESSAGING, SUCH AS FOR RICH MEDIA MESSAGES INCORPORATING DIGITAL CONTENT

This application is a continuation of U.S. patent application Ser. No. 10/611,698, filed on Jun. 30, 2003, and entitled "Adaptive Media Messaging, Such As for Rich Media Messages Incorporating Digital Content," which claims the benefit of U.S. Provisional Application No. 60/393,176, filed on Jul. 1, 2002. Both applications are herein incorporated by reference in their entirety.

TECHNICAL FIELD

The present invention is directed to the field of media delivery techniques.

BACKGROUND

Electronic mail ("email") is a form of Internet. Protocol (IP) messaging that has proven a useful medium for several different types of communications. In particular, email has been used to deliver marketing messages to single recipients and groups of recipients.

Initially, such email-conveyed messages were expressed in plain-text format. One advantage of the plain-text format is that recipients can read such messages no matter what email client program ("email client") they use. A significant disadvantage of the plain-text format is that its display is undistinguished and unattractive relative to other types of visual displays possible on many computer systems, and is in that sense poorly suited to direct promotional marketing and other high impact business communications. Furthermore, recipient activity with the message cannot be tracked, representing another significant business limitation, Since the advent of email clients capable of sending and receiving email in HTML format, some IP messages have been expressed in HTML format. While this facilitates somewhat richer and more colorful displays than plain-text format, such messages are typically static, not trackable, and still relatively poorly suited to achieve high impact with recipients.

In view of the disadvantages of conventional kinds of IP messages such as those discussed above, new kinds of IP messages that include multi-media elements and that can adapt to the capabilities of a recipient's computer system would have significant utility. Such adaptive IP messages could be used, for example, to replace mailed print brochures with interactive multi-media brochures, or improve the effectiveness of email marketing campaigns.

DETAILED DESCRIPTION

Figure 1:
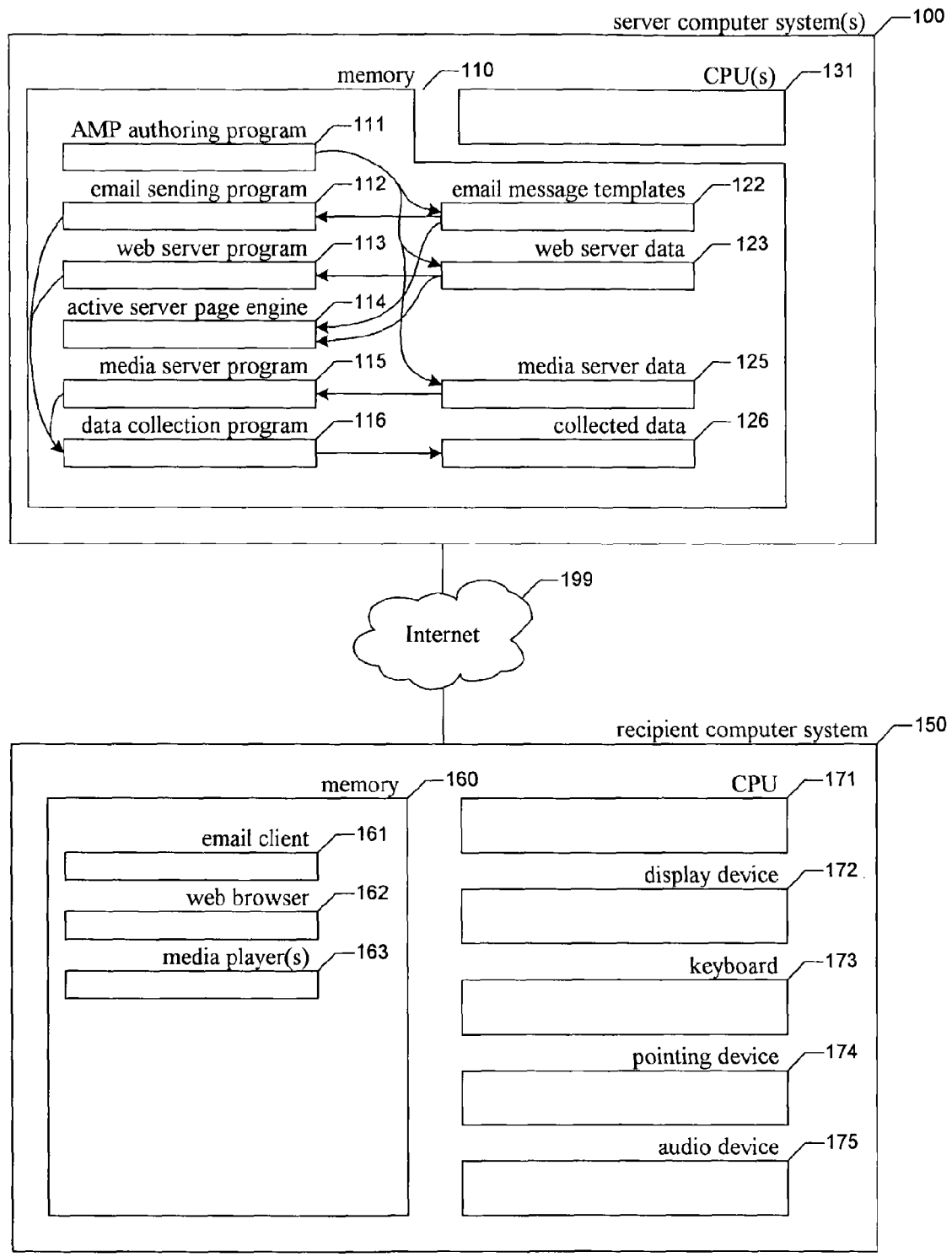
FIG. 1 is a block diagram showing typical configurations of and connections between computer systems on which the facility operates.

A software facility is provided for presenting rich media adaptive IP messages ("the facility") containing rich media elements such as audio, video with or without audio, a variety of digital content. For example, the adaptive IP messages presented by the facility can contain digital content elements including multi-media and/or rich media elements, animation with or without audio, text, or images. In various embodiments, the facility generates, delivers, remotely supports, and tracks adaptive media packages containing digital content elements, such that the facility automatically adapts itself to render the digital media elements it contains differently on different recipients' computer systems based upon the particular media capabilities of each computer system, thus providing the most engaging version of the message possible on each recipient computer system.

In some embodiments, the facility provides authoring tools for generating multiple versions, or "layers" of an IP message to be delivered to one or more recipients, such as an email message, each layer optimized for display on recipient computer systems having different sets of digital content and other capabilities. The authoring tools receive, for each of one or more digital content elements such as a video sequence, a single version of the digital content element, as well as information such as an image specifying an environment for the digital content element(s). The authoring tools transform the received information into a number of different layers, each of which contains different versions of the digital content elements(s) in the context of the specified environment. Such different versions of the digital content element(s) may include versions that utilize different kinds of media players (such as video players and animation players) or programs of other kinds; versions that consume different levels of recipient computer system resources such as bandwidth, computing power, or memory; etc. The authoring tools may also add links or other user interface controls to the layers to enable recipients to get further information about the message, forward the message to another recipient, request to not receive similar messages in the future, etc. Any given layer may be either pre-generated, or dynamically generated in response to each request for the layer.

In addition to generating the different layers of the message, the authoring tools may also generate client-side tests for testing the recipient computer system capabilities and selecting the most appropriate layer of the message based upon the results of the tests. The authoring tools may also generate server-side tests for incorporating other media elements in the IP message for certain recipients based upon earlier tracking results for those recipients. For example, for an IP message whose primary digital content element is a video clip featuring a particular character, such a test may determine that, because a particular recipient consistently stopped early in viewing video clips included in earlier IP messages featuring the same character, this recipient should instead receive an alternate video clip in which the character does not appear.

In some embodiments, the facility includes an email message generating component that begins with an initial one of the layers of the message, and adds (1) client-side scripts and (2) recipient-specific customization information. The added client-side scripts perform such functions as: reporting on the opening of the email message; testing the digital content capabilities of the recipient computer system; selecting the most appropriate layer of the message based upon the results of the tests; and replacing the contents of the message with the selected layer. The recipient-specific customization information may include special information designed to appeal specifically to the recipient, such as the recipient's name, or a message thanking the recipient for making a recent purchase.

When one of these email messages is received on a recipient computer system, it is stored in an email inbox on the recipient computer system. When the recipient opens the email message, the initial layer is displayed within the email message. The initial layer typically contains an image tag that causes the downloading of a very small image from the server computer system, thereby notifying the server computer system of the opening of the message for tracking purposes. Other layers of the adaptive media package also typically contain such an image tag, similarly facilitating the tracking of their opening.

If script processing functionality is available and enabled for HTML email messages, the scripts in the email are executed in order to test the media capabilities of the recipient computer system; select the most appropriate layer of the message based upon the results of the tests; and replace the contents of the message with the selected layer. If script processing functionality is not available or not enabled for HTML email messages, the scripts in the email message do not execute. Accordingly, the initial layer of a message typically includes a link that the recipient may traverse in order to open the first layer in a browser window, which similarly reports on the opening of the IP message; tests the media capabilities of the recipient computer system; selects the most appropriate layer of the message based upon the results of the tests; and replace the contents of the browser window with the selected layer.

While the initial and any subsequent layer of the IP message is open, the facility typically monitors actions taken by the recipient with respect to the message, such as the layer ultimately used, the amount of time the message was open or the digital content element was playing, the links in the message followed by the recipient, etc. In some embodiments, the facility also collects additional information, such as the configuration of the recipient's computer system, the total number of times the recipient views the IP message, etc. Such information is typically collected by server computer and systems, such as web servers and media servers, that serve data needed to support the operation of adaptive media packages. Such data is requested using links stored inside each adaptive media package, which are typically encoded with an indication of the recipient's identity so that information collected from a recipient can be associated with the recipient's identity. The recipients' activity information can be recorded in real-time or delayed, depending on requirements and configuration.

In some embodiments, the facility may collaborate with other software applications, such as those that manage the actual sending of the adaptive media packages, and/or those that store, analyze, or otherwise consume the results of tracking the adaptive media packages. These other applications can include CRM or other contact-management, customer tracking, or workflow applications, as well as applications of various other types. Additionally, some embodiments of the facility provide native addressing and reporting modules, such as those that provide their own user interfaces.

FIG. 1 is a block diagram showing typical configurations of and connections between computer systems on which the facility operates. FIG. 1 shows one or more server computer systems 100 connected via a network such as the Internet 199 to a recipient computer system 150. It will be appreciated by those of skill in the art that any number of recipient computer systems may be similarly connected to the server computer systems. It will also be appreciated by those of skill in the art that resources and/or functionalities shown in the server computer system 100 may be duplicated on or distributed across a number of different server computer systems.

The recipient computer system 150 includes memory 160, whose contents may be stored in volatile memory devices, persistent memory devices, or a combination of the two; one or more central processing units ("CPUs") 171 for executing programs; a display device 172 such as a video monitor for displaying visual information, including email client windows and their contents, browser windows and their contents, and digital content elements; a keyboard 173 for inputting text; a pointing device 174, such as a mouse, for selecting locations on the display device; and an audio device 175 for rendering audio sounds and sequences, such as those that are part of an adaptive media package. The memory 160 includes programs such as an email client 161, a web browser program 162, and one or more media player programs 163.

The server computer system 100 includes one or more central processing units ("CPUs") 131, as well as memory 110, whose contents may be stored in volatile memory devices, persistent memory devices, or a combination of the two. The memory contains an adaptive media package ("AMP") authoring program 111, which is used to generate an adaptive media package, made up of: IP message templates 122, which are transformed into individual IP messages embodying the initial layer of the adaptive media package for delivery to recipient computer systems by an IP message sending program 112; web server data 123 for delivery by web server program 113 in response to requests generated by the recipient computer system as a result of receiving the IP message, including manifestations of the additional layers of the adaptive media package, and other elements needed by the message, such as static images; and media server data 125, such as audio sequences, video sequences with or without audio, or animation sequences with or without audio, that are incorporated in layers of the adaptive media package and delivered to the recipient computer system by a media server program 115 in response to requests from the recipient computer system after receiving the IP message. The memory may also contain an active server page engine 114 for processing active server pages among the web server data that are requested in requests presented to the web server program, and/or for processing active server pages among the IP message template that are sent by the IP message sending program. The memory typically also includes a data collection program 116 for collecting collected data 126 describing the sending of adaptive media packages to each of a number of recipients, as well as subsequent processing for those alternative media packages that relates to how they are used on the recipient computer systems.

While computer systems configured as described above are typically used to support the operation of the facility, those skilled in the art will appreciate that the facility may be implemented using devices of various types and configurations, and having various components.

Figure 2:
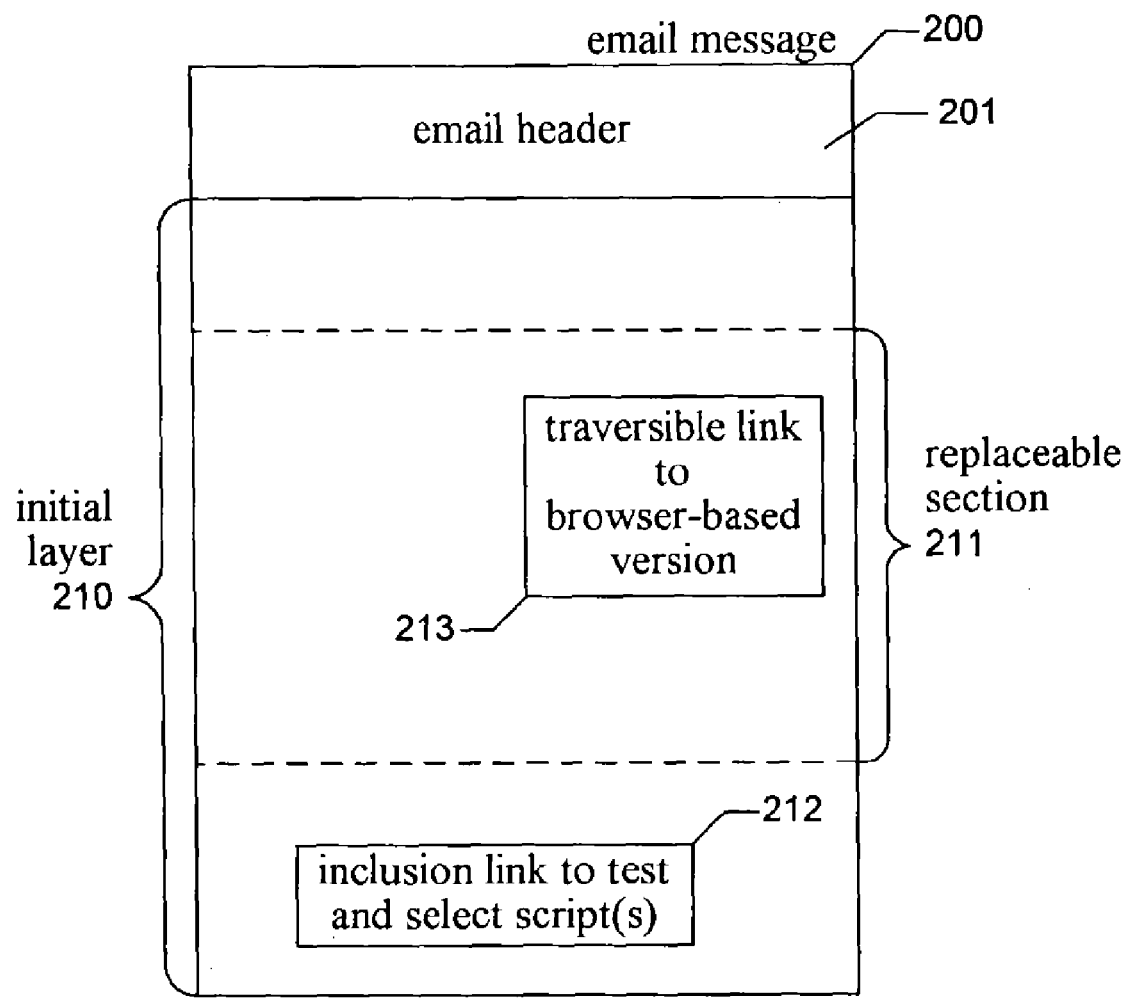
FIGS. 2-7 are conceptual diagrams showing typical adaptation and display of a sample adaptive media package.

FIGS. 2-7 are conceptual diagrams showing typical adaptation and display of a sample adaptive media package. FIG. 2 shows the IP message 200 as it is initially delivered to the recipient computer system. The IP message includes a message header 201, as well as HTML contents 210 embodying the initial layer of the adaptive media package. The initial layer typically includes visual information that provides a visual context for the digital content element of the adaptive media package, such as a static image. In some embodiments, this static image is divided into a number of smaller panels, which are requested separately by separate inclusion links in the initial layer and displayed in an arrangement that forms the image. The initial layer typically does not contain any digital content elements. Rather, the initial layer includes an inclusion link 212 to one or more scripts for testing the capabilities of the recipient computer system and selecting the appropriate layer of the message to ultimately display. As is discussed in conjunction with FIGS. 3-5 below, if IP message 200 is opened in an email client program that supports HTML message scripting, inclusion link 212 is given effect in order to incorporate the testing and selecting scripts into email message 200, then execute them to ultimately replace replaceable section 211 of the email message with data embodying the selected layer. As discussed below in conjunction with FIGS. 6 and 7, if email message 200 is displayed in a manner that does not support HTML scripting, such as an email client that does not have that capability, an email client in which that capability is disabled, or a special mode of an email client in which that capability is unavailable, such as a preview pane, then the user may click on a traversable link 213 to a browser-based version of the adaptive media package, in order to test the capabilities of the recipient system, select an appropriate layer, and display the selected layer in a web browser window.

Figure 3:
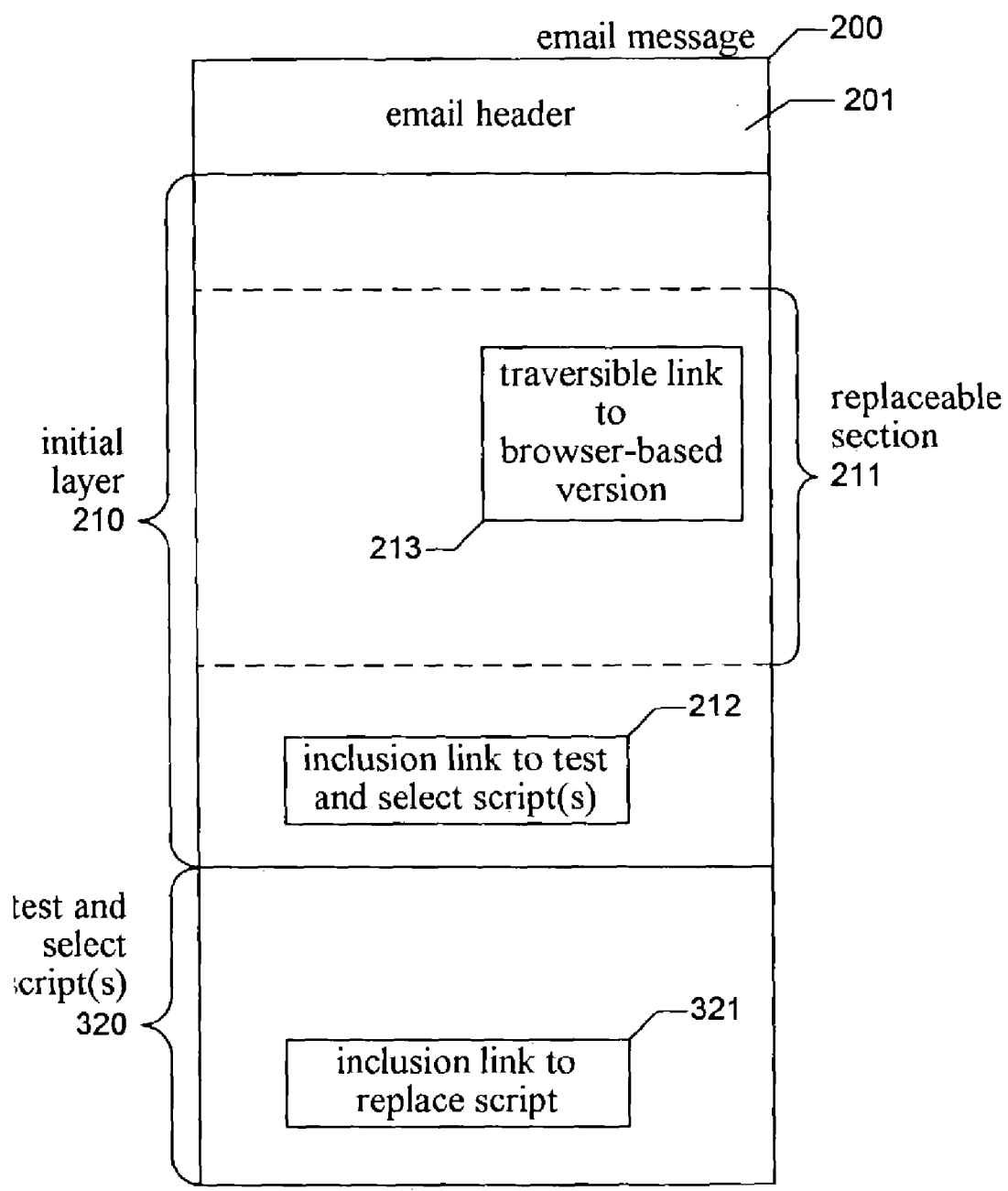
Figure 4:
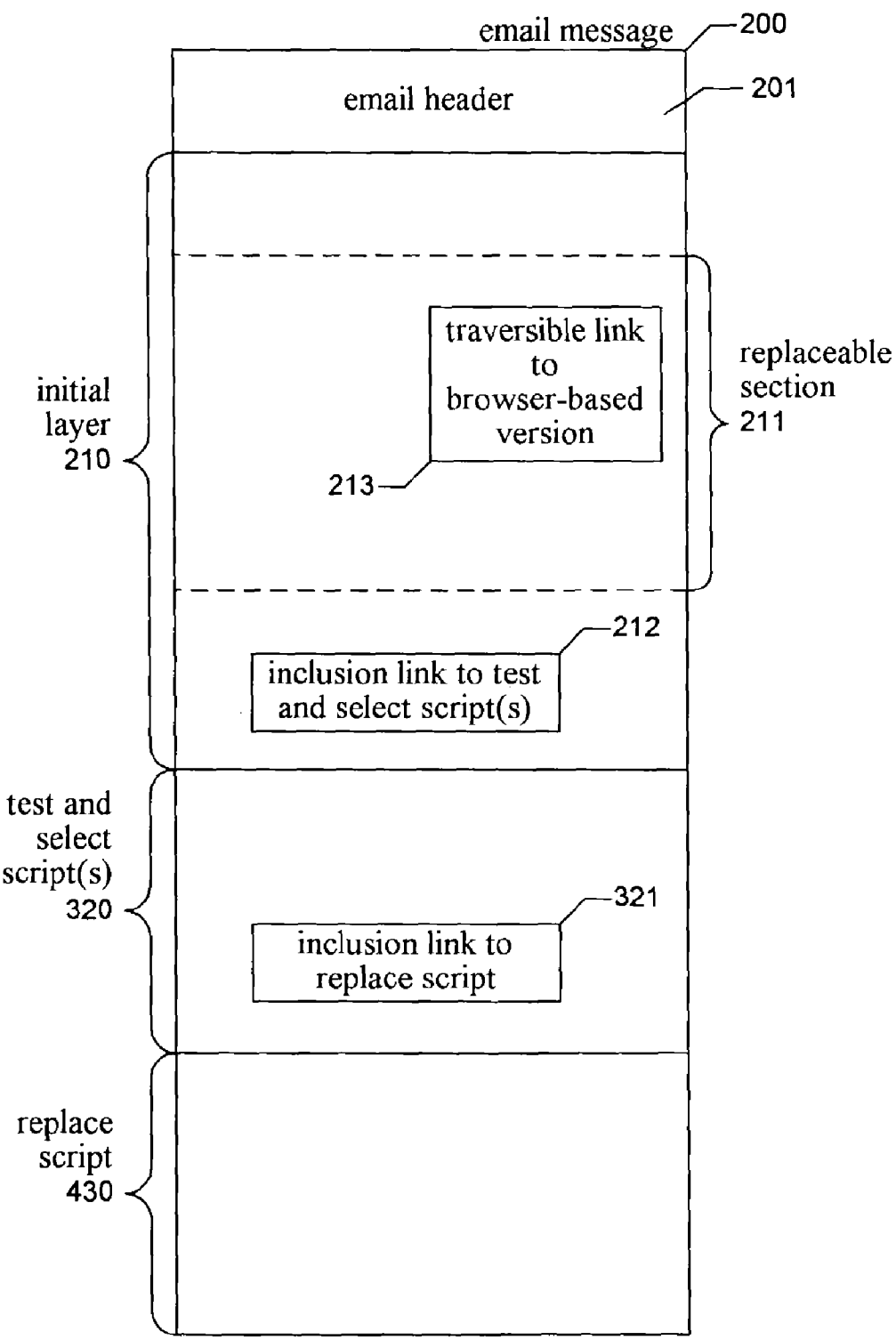
Figure 5:
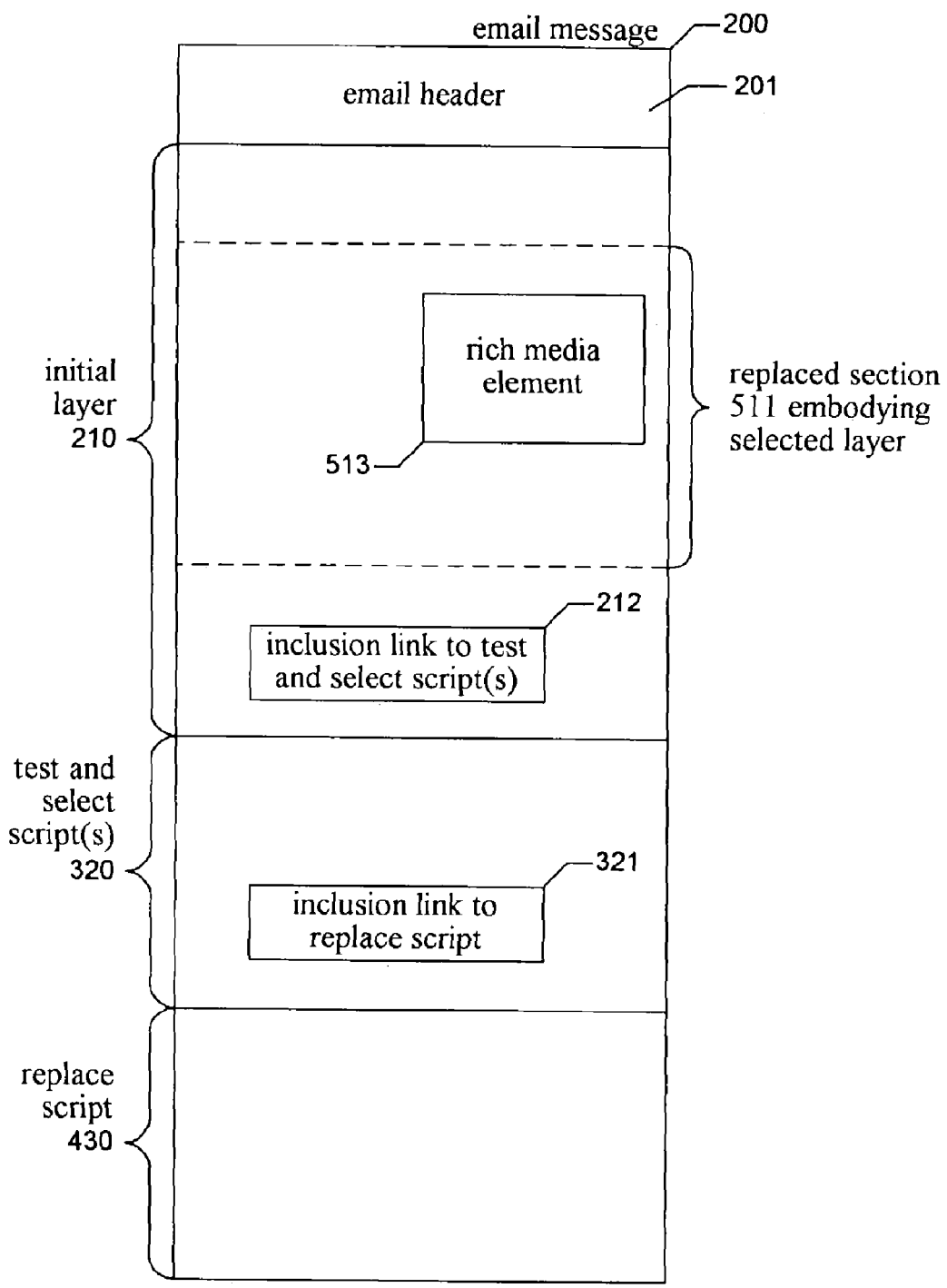

FIGS. 3-5 show stages in the process of displaying the adaptive media package within the original IP message, which the facility can accomplish if script processing is available and enabled. FIG. 3 shows the appending to email message 200 of the test and select scripts 320 referenced in inclusion link 212. In some embodiments, the test and select scripts 320 are a number of different files that are serially chained into the IP message 200. The test and select scripts both (1) test capabilities of the recipient computer system relevant to the display of various types of digital content elements, and (2) select an appropriate layer of the adaptive media package based upon the results of the testing.

In various embodiments, testing includes system resources such as communications bandwidth, processor speed, available or total memory, etc. For example, a determination of communications bandwidth can assist in the decision of whether to select layers containing the digital content elements whose total size is large versus small. Bandwidth testing may be performed, for example, by downloading a body of data of a known size, preferably from the server containing the media server program, determining the amount of time elapsed during the download, and dividing the former by the latter. In various embodiments, the tests determine whether certain programs are installed and available for use, such as certain versions of a video player, such as the Microsoft Windows Media player, and animation players, such as certain versions of the Macromedia Flash player. Such tests may be performed in various ways, such as reading the recipient computer system's registry or other locations in its persistent memory to determine whether the particular program has been installed; attempting to instantiate an instance of the particular player; etc.

Depending upon the results of these tests, the scripts select the most appropriate layer of the message. In some cases, this is the most aggressive type of digital content element for which a player is available on the recipient computer system, in a size that is compatible with the bandwidth to the recipient computer system. Where none of the tested-for players are available on the recipient computer system, a layer may be selected that includes controls such as a link for downloading and installing one of these players.

The test and select scripts 320 include an inclusion link 321 to a script for downloading the selected layer and substituting it in the email message for the replaceable section.

FIG. 4 shows the inclusion in the IP message of script 430 for replacing the replaceable section 211 with data embodying the selected layer. The replace script typically includes the data with which the replaceable section 211 will be replaced by the replace script. In some cases, this replacement data is included in the replace script in an encoded form, such as in Unicode form. Where the replacement data is encoded, the replace script decodes it. For instance, where the replacement data is encoded in Unicode form, the facility decodes the replacement section using an "unescape" function. The replace script further replaces the replaceable section with the replaced section. In some embodiments, this involves assigning the decoded replacement section data to an innerHTML document object model property of a DIV grouping element corresponding to the replaced section.

FIG. 5 shows the result of executing the replace script 430. It can be seen by comparing FIG. 5 to FIG. 4 that replaceable section 211 has been replaced with replaced section 511, which embodies the layer selected by the test and select script. The replaced section embodying the selected layer includes a version 513 of the digital content element in a particular media element type that is appropriate for the recipient computer system. The displayed digital content element is typically displayed in the context of other visual information, such as a static image, which may be downloaded from the server computer system piecemeal as described above.

Figure 6:
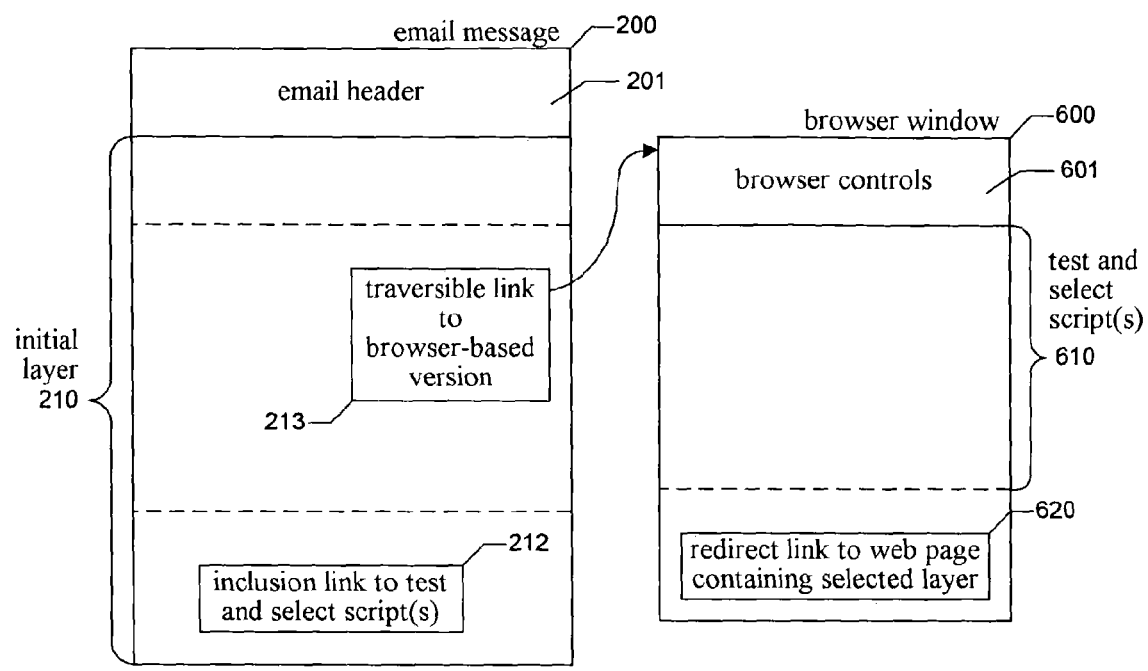
Figure 7:
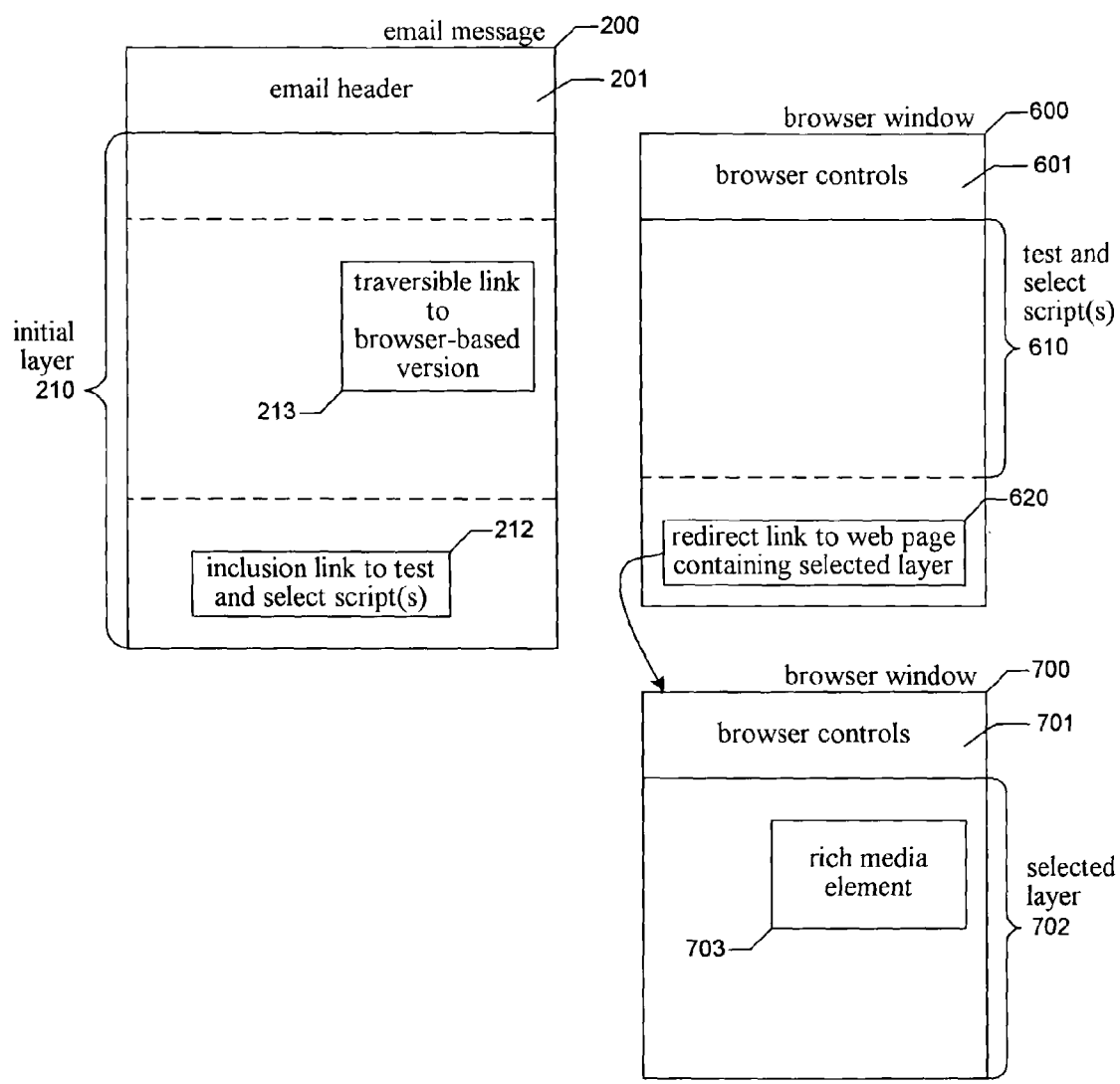

FIGS. 6 and 7 show the display of the adaptive media package in a separate browser window when scripting in the IP message cannot be processed. FIG. 6 shows the traversal by the user of traversable link 213 to a browser-based version of the adaptive media package. When this link is traversed, such as by clicking on it, a new browser window 600 is opened. The browser window contains browser controls 601 as well as the data downloaded using the reference stored in the traversable link. This data includes browser-based test and select scripts 610 that are similar to test and select scripts 320, and perform a similar function. The data loaded into the browser also includes a redirect link 620 to a web page containing the layer selected by the test and select scripts. Once the test and select scripts execute to test the capabilities the recipient computer system and select an appropriate layer, the redirect link loads a web page embodying the selected layer into browser window 600.

FIG. 7 shows the display of the selected layer 702 in the browser window 700. The selected layer contains a version 703 of the digital content element as appropriate for the recipient computer system. The displayed digital content element is typically displayed in the context of other visual information, such as a static image, which may be downloaded from the server computer system piecemeal as described above.

In some embodiments, the subsequent layers of the adaptive media package are downloaded from the web server as active server pages, or other templates supporting server-side scripting. This enables the facility to adapt the specific contents of the layer in a number of ways, including: encoding the links in the layer with the recipient's recipient identifier, so that subsequent dereferencing of any of these links identifies the recipient as the dereferencer for tracking purposes; including customized visual information, such as the recipient's name, or a message based upon the recipient's activity;

alternative digital content elements that tracking of the recipient reveals are better-suited to the recipient than the primary digital content elements for the adaptive media package; etc.

Figure 8:
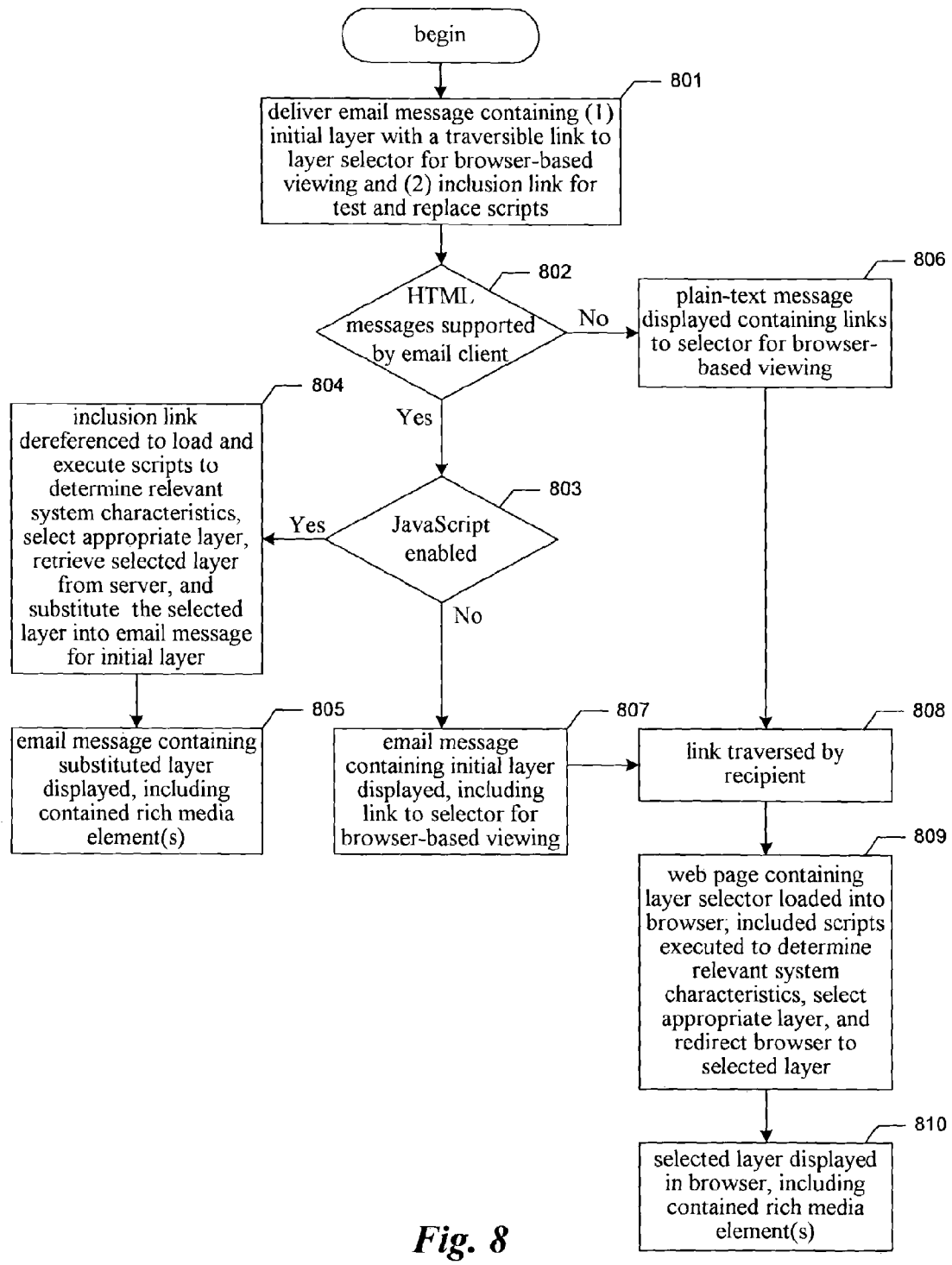
FIG. 8 is a flow diagram showing the adaptation and display of an adaptive media package.

FIG. 8 is a flow diagram showing the adaptation and display of an adaptive media package. In step 801, an IP message containing the initial layer of the adaptive media package is delivered to the recipient computer system. The IP message contains a traversable link to a layer selector for browser-based viewing of the adaptive media package, as well as an inclusion link for test and replace scripts that support email message-based viewing of the adaptive media package. In step 802, if HTML messages are supported by the email client on the recipient computer system, then the facility continues to step 803, else the facility continues in step 806. In step 803, if JavaScript is enabled for the IP message as currently displayed, then the facility continues in step 804, else the facility continues in step 807. In step 804, the inclusion link is dereferenced to load and execute scripts to determine the relevant system characteristics of the recipient computer system, select an appropriate layer based upon those characteristics, retrieve the selected layer from the server, and substitute the selected layer into the IP message for the initial layer. In step 805, the facility displays the IP message containing the substituted layer, which includes the version of the digital content element or elements contained in the substituted layer. In step 806, though HTML IP messages are not supported by the email client, a portion of the email message in plain text is displayed and contains a link to a layer selector web page for browser-based viewing of the adaptive media package. Similarly, in step 807, the rendered HTML IP message containing the initial layer is displayed, which also includes a link to the layer selector web page for browser-based viewing of the adaptive media package. In step 808, one of these links is traversed by the recipient. In step 809, the web page containing the layer selector is loaded into a new browser window. The scripts included in this web page are executed to determine the relevant system characteristics, select a layer that is appropriate in light of these characteristics, and redirect the browser to a web page embodying the selected layer. In step 810, the selected layer is displayed in the browser window, including one or more digital content elements of the appropriate type.

Figure 9:
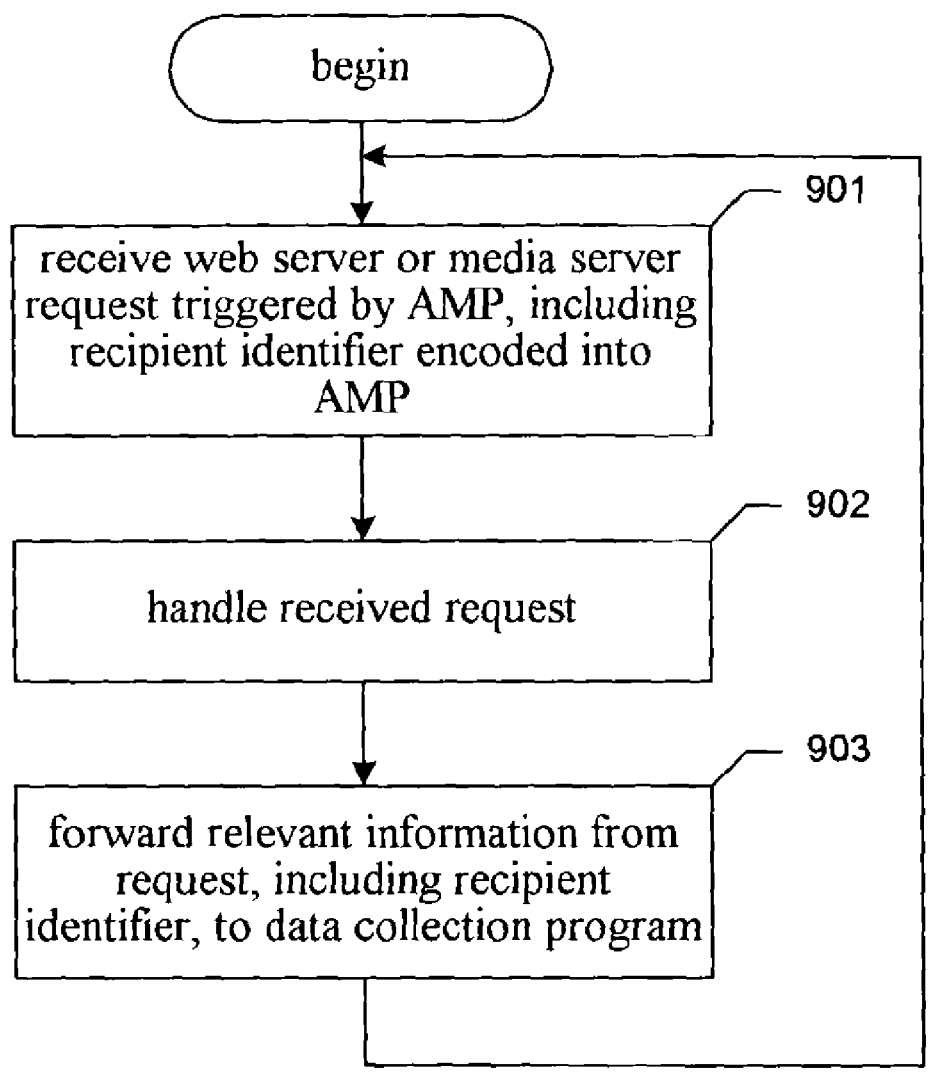
FIG. 9 is a flow diagram showing the steps typically performed by the facility in order to monitor the operation of the adaptive media package.

FIG. 9 is a flow diagram showing the steps typically performed by the facility in order to monitor the operation of the adaptive media package. In step 901, the facility receives in a server computer system a web server or media server request triggered by the adaptive media package. These requests typically include a recipient identifier that was encoded into the adaptive media package during its generation. In step 902, the facility handles the request received in step 901. In step 903, the facility forwards the relevant information from the request received in step 901, including the recipient identifier, to a data collection program. The data collection program compiles such information for each recipient, and makes it available for reporting and other analysis. After step 903, the facility continues in step 901 to receive the next request.

Figure 10:
FIGS. 10-18 are display diagrams showing the display of various different layers of a sample adaptive media package.

FIGS. 10-18 are display diagrams showing the display of various different layers of a sample adaptive media package. FIG. 10 is a display diagram showing the display of the initial layer of the adaptive media package. The display occurs in the window 1000 of the recipient computer system's email client. The email client contains an in-box 1010 for received email messages, which in turn contains the email message 1011 containing the adaptive media package. The contents of this message are shown in a preview pane 1020 of the email client. In the preview pane, both the email header 1021 and the email contents 1022 are shown. Because this email client does not execute scripts for messages whose contents are shown in its preview pane, the script in the email message does not execute, and the initial layer of the adaptive media package continues to be displayed. This layer includes traversable link 1023, which the recipient may click in order to display the adaptive media package in a separate web browser window.

Figure 11:
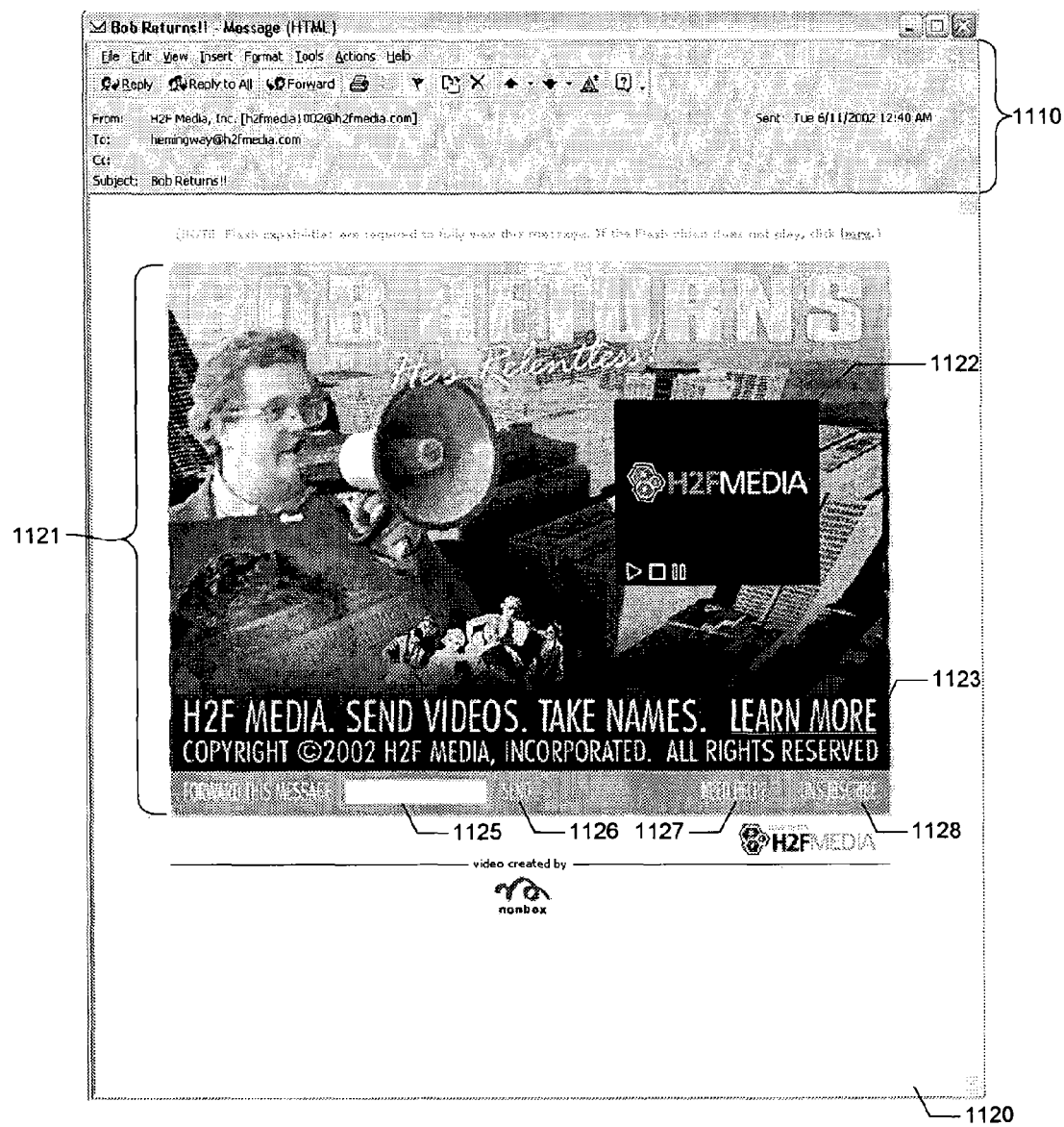

FIG. 11 shows the display of a subsequent layer of the adaptive media package in the context of the IP message. An IP message window 1100 has been opened which contains the email header information 1111, as well as the message contents 1120. Because scripts are executed within separate email message windows by this email client, the script in email has executed to replace the first layer of the adaptive media package shown in FIG. 10 with a subsequent layer 1121. This layer includes an animation version 1122 of the digital content element, which will automatically commence playing. A layer such as this one is typically displayed on a recipient computer system on which a video media player is not available, but an animation player is, or a recipient computer system on which a limited amount of bandwidth of available.

Also contained in this layer, as well as many of the other layers of the adaptive media package, are links and other controls that enable the recipient to obtain further information about the message, forward the message to another recipient, request to not receive similar messages in the future, etc. Here, these links and controls include a link 1123 to obtain further information about the message; field 1125 and send link 1126 for forwarding the message to another recipient; link 1127 to obtain assistance in using the message; and link 1128 to unsubscribe from the mailing list that caused the message to be sent to the recipient.

Figure 12:
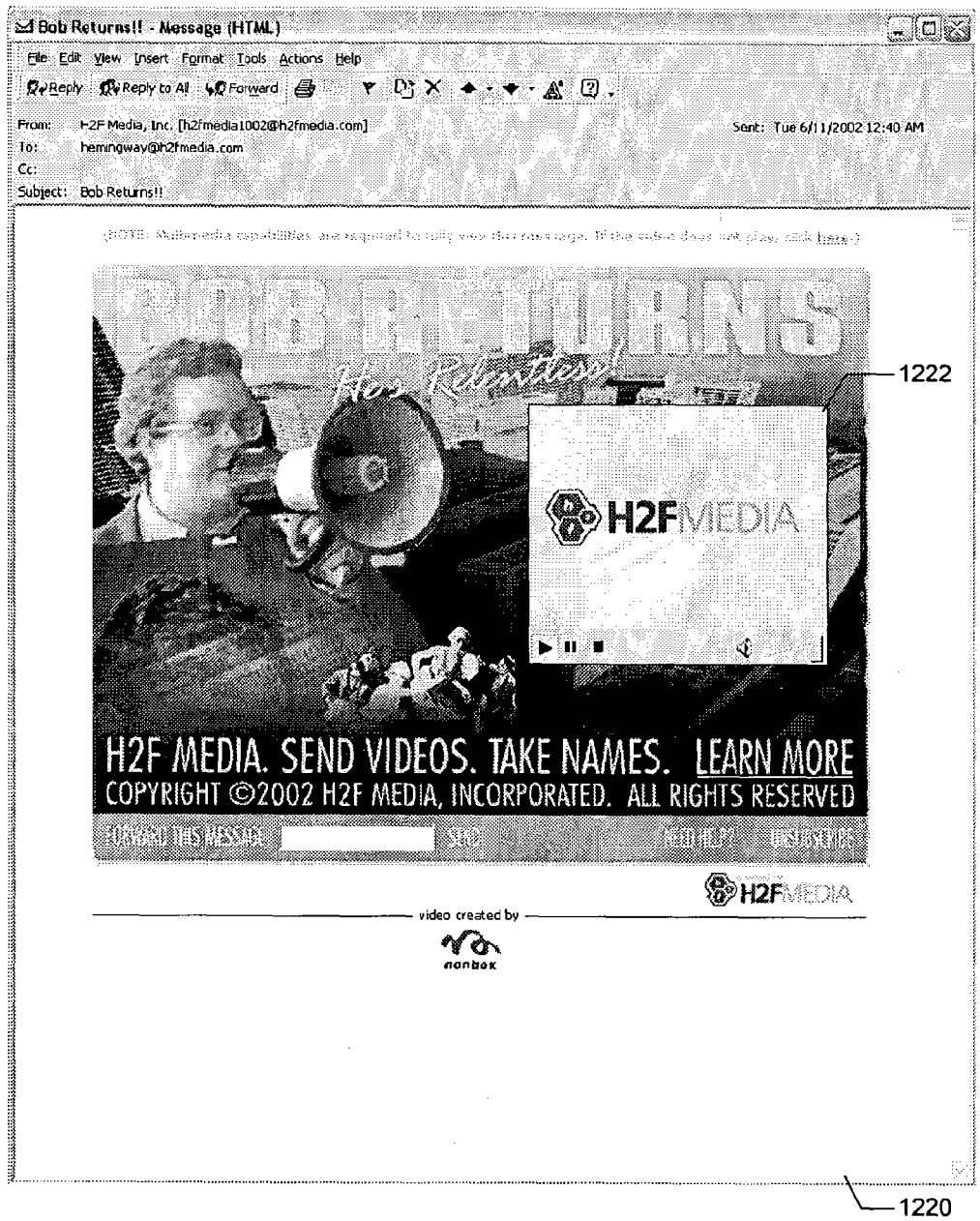

FIG. 12 is a display diagram showing the display of a layer containing a high-quality video version 1222 of the digital content element in the context of the IP message. A layer such as this one is typically displayed on a recipient computer system on which a video media player is available, and a high amount of bandwidth is available.

Figure 13:
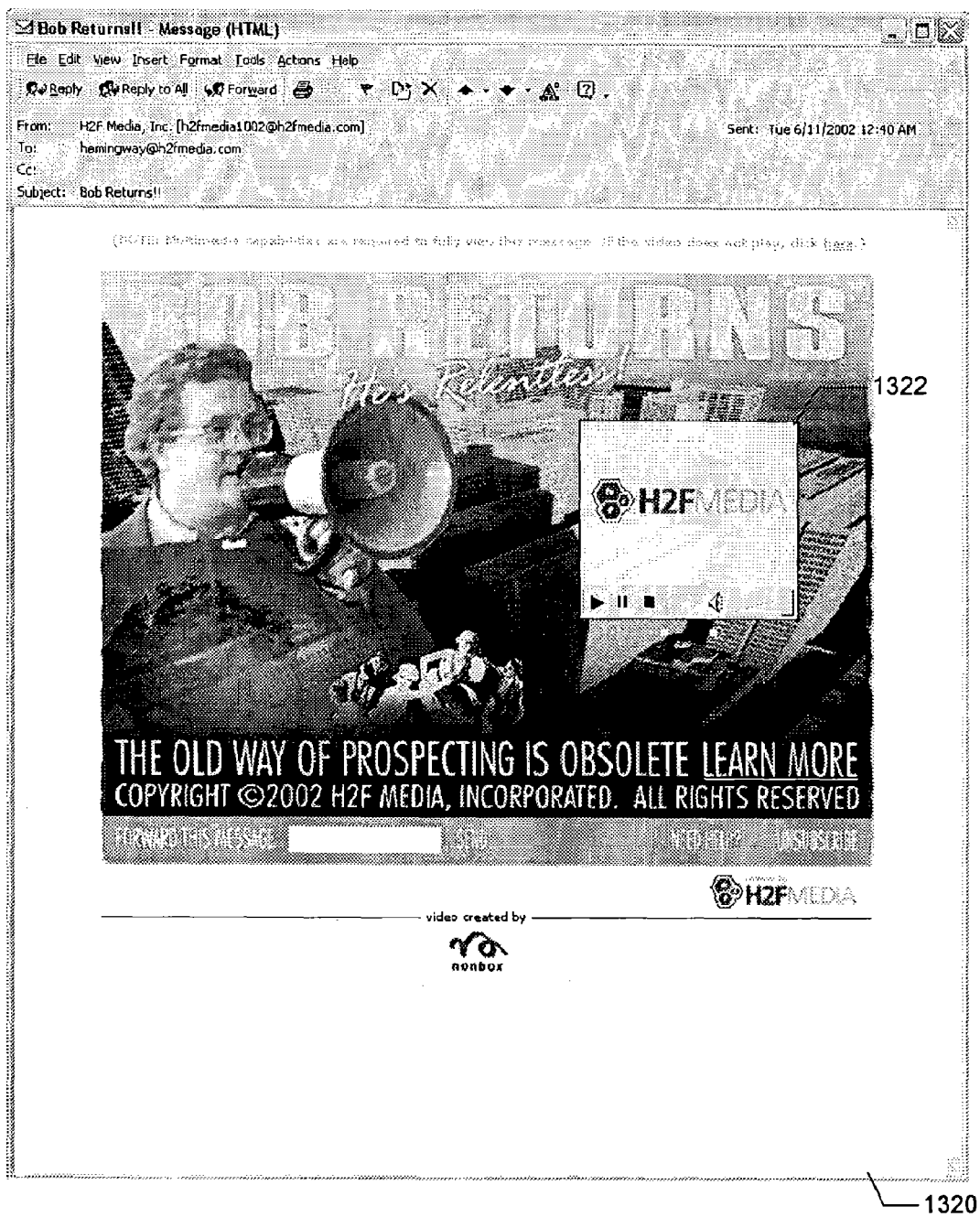

FIG. 13 is a display diagram showing the display of a subsequent layer of the adaptive media package containing a low-quality video version 1322 of the digital content element in the context of the IP message. A layer such as this one is typically displayed on a recipient computer system on which a video media player is available, but only an intermediate amount of bandwidth is available.

Figure 14:
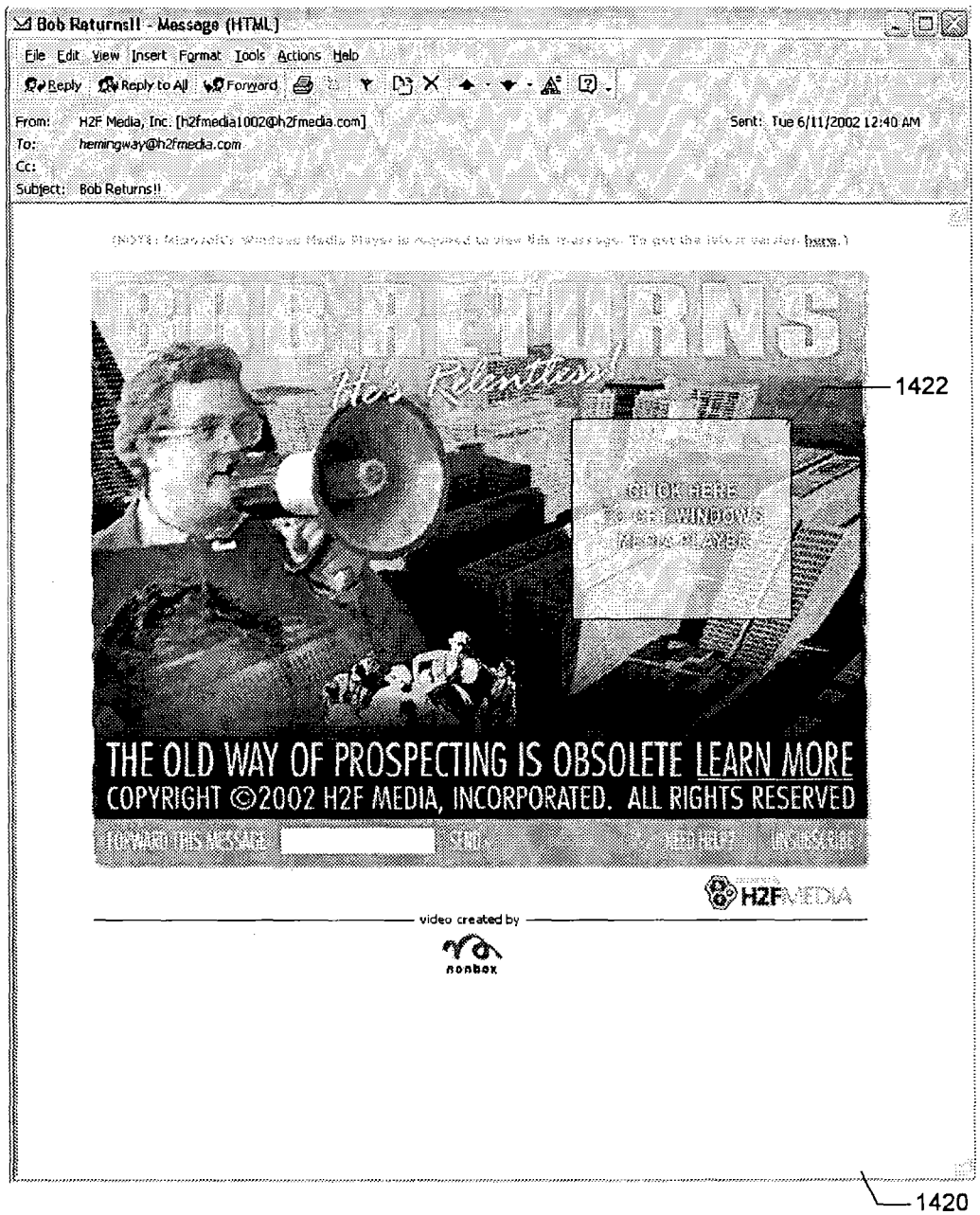

FIG. 14 is a display diagram showing a subsequent layer of the adaptive media package in the context of the IP message that does not immediately contain any version of the digital content element. A layer such as this one is typically displayed on a recipient computer system where neither a video media player nor an animation player is available. This layer includes a link 1422 that the user may traverse in order to download and install a video player, and use it to view a version of the digital content element.

Figure 15:
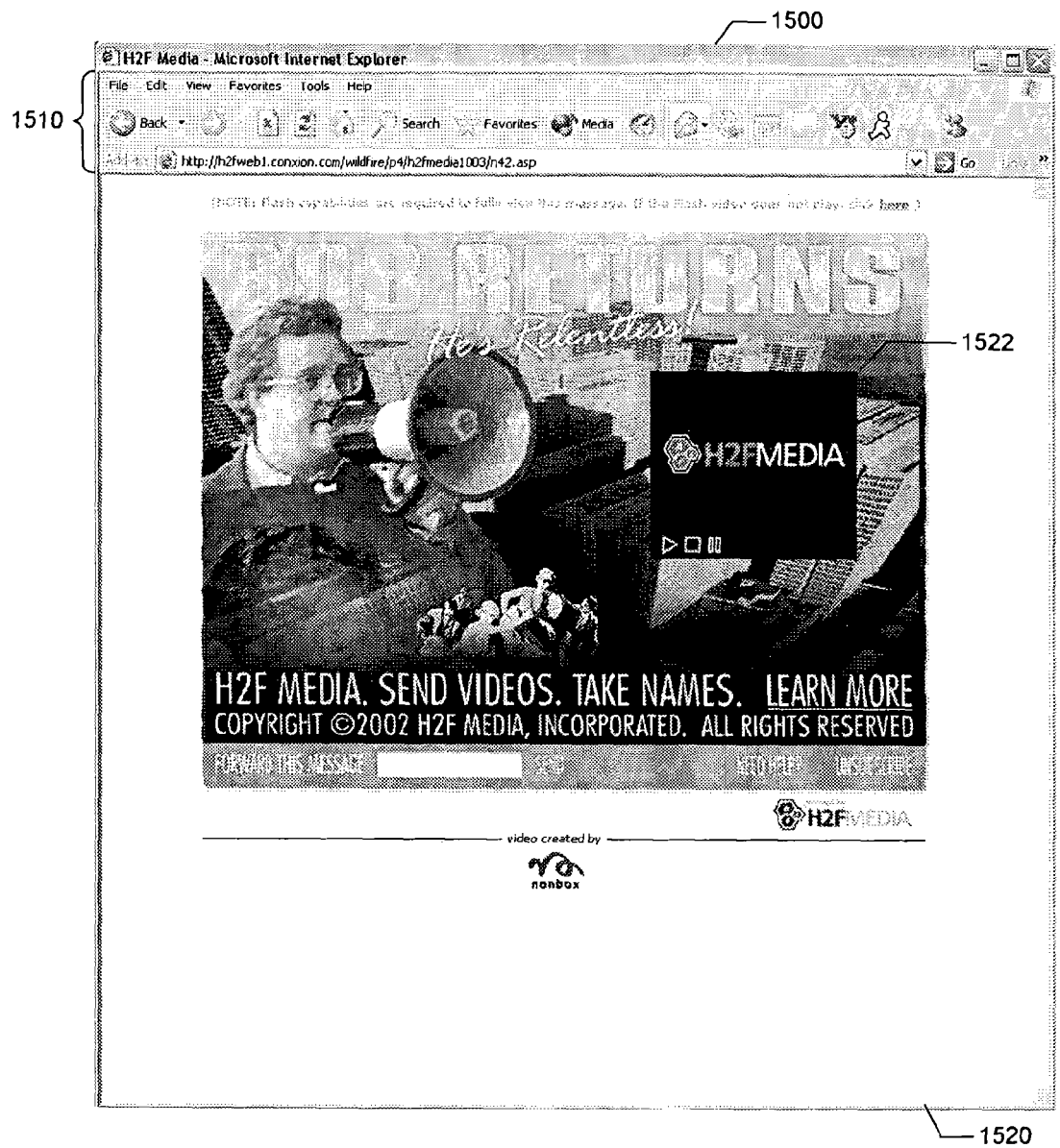

FIGS. 15-18 are display diagrams showing the display of a subsequent layers of the adaptive media package in a web browser window. FIG. 15 is a display diagram showing a subsequent layer of the adaptive media package containing an animation version 1522 of the digital content element.

Figure 16:
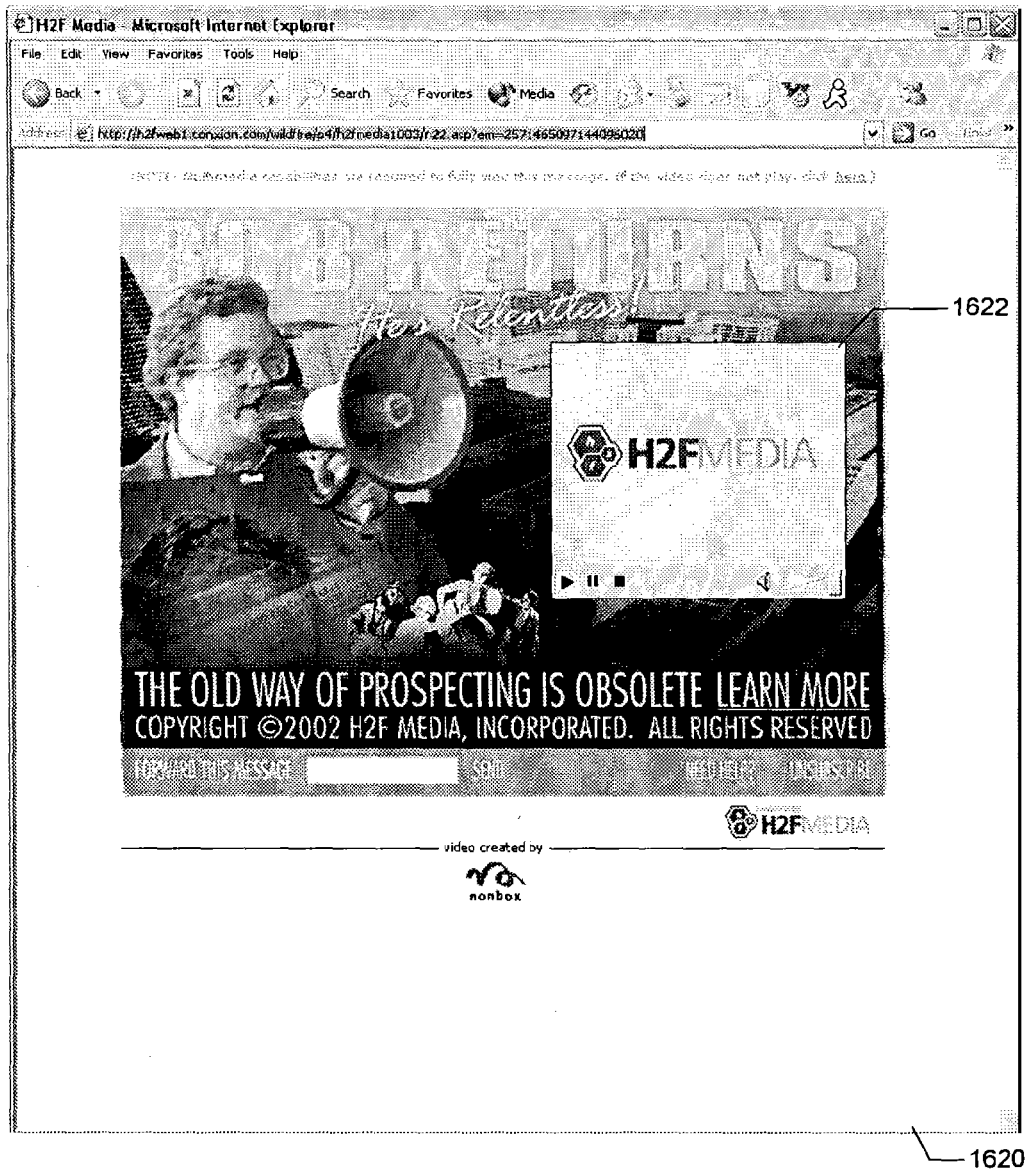

FIG. 16 is a display diagram showing a subsequent layer of the adaptive media package containing a high-quality video version 1622 of the digital content element that is displayed in a web browser.

Figure 17:
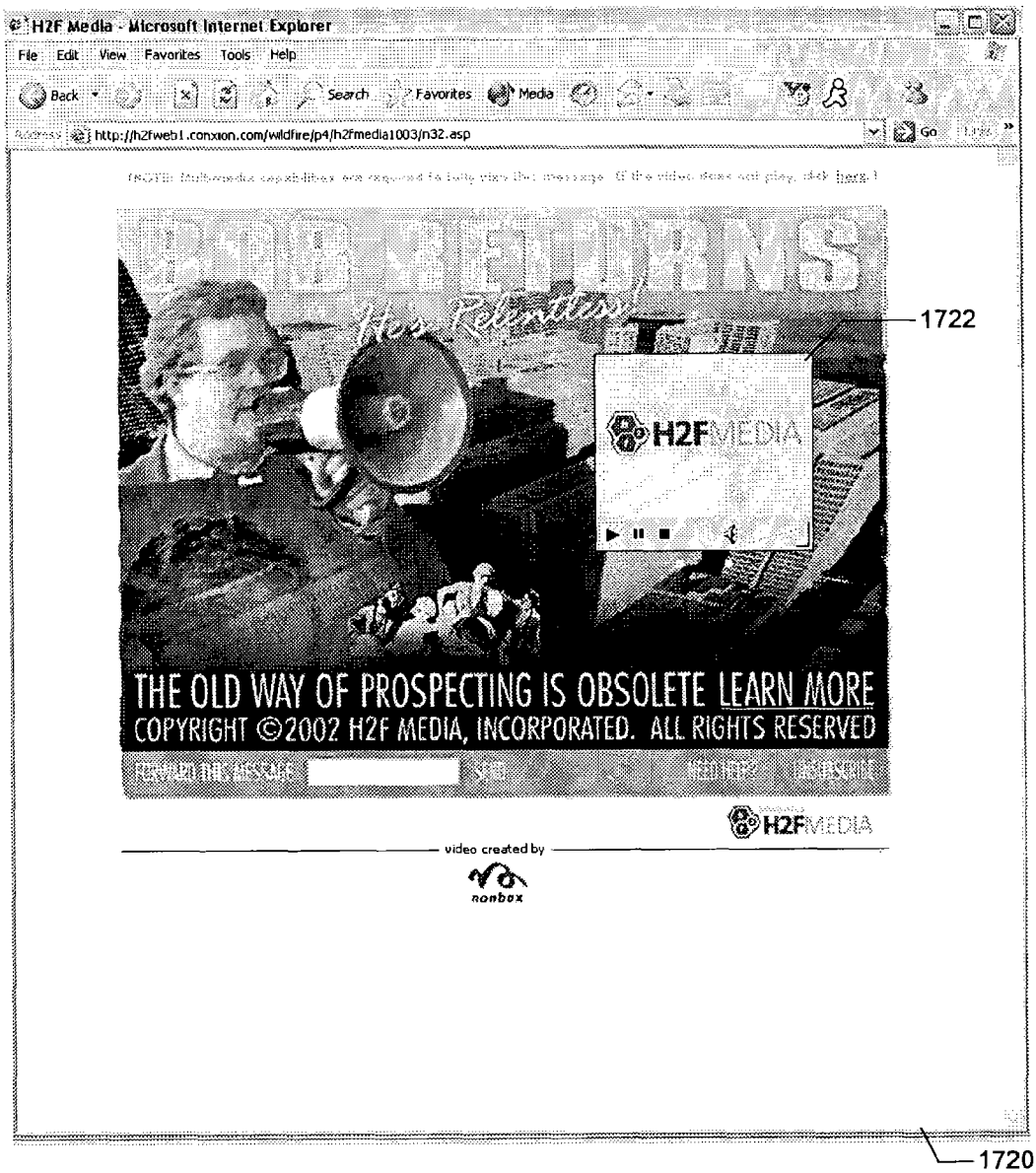

FIG. 17 is a display diagram showing a subsequent layer of the adaptive media package containing a low-quality video version 1722 of the digital content element that is displayed in a web browser.

Figure 18:
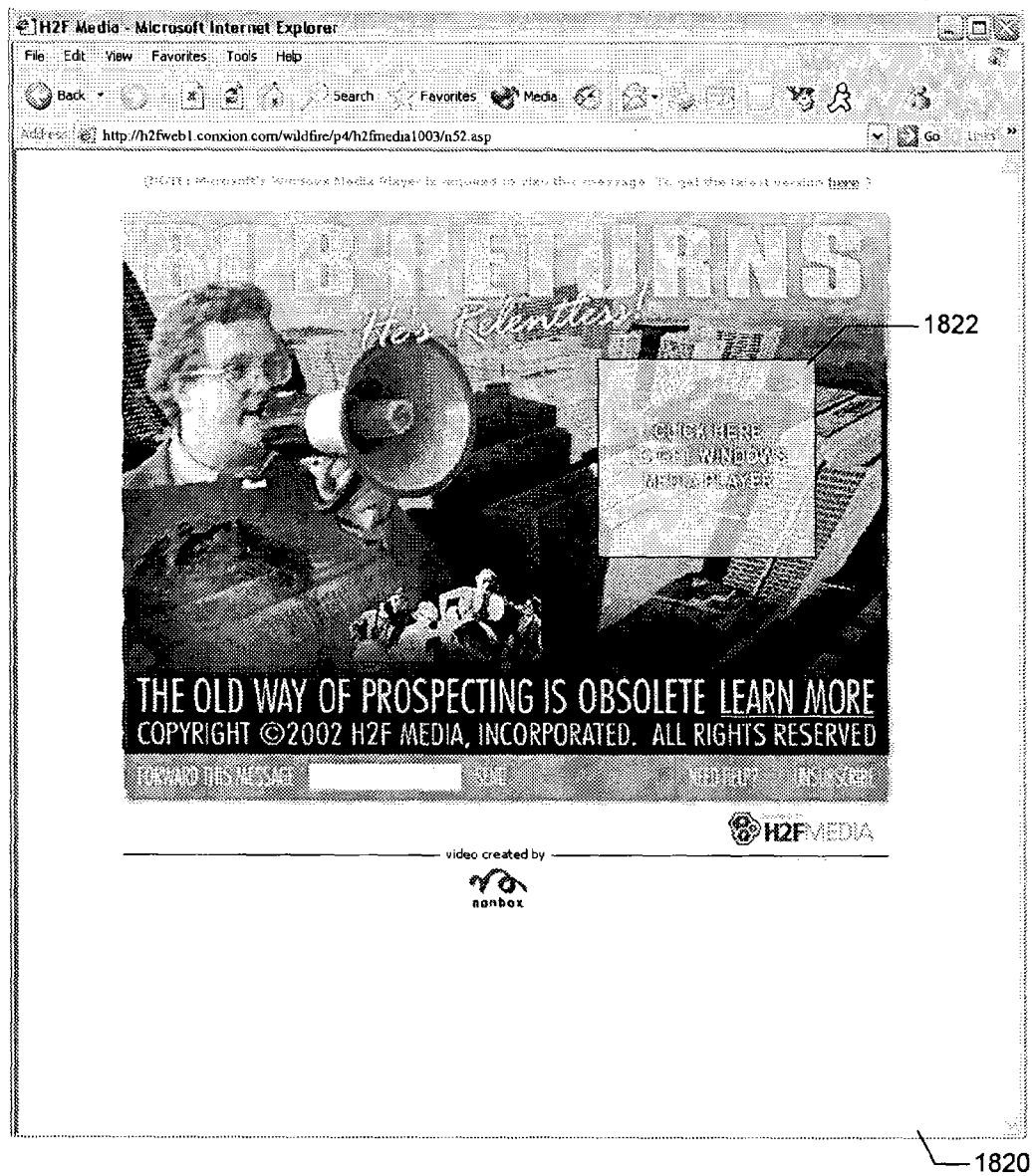

FIG. 18 is a display diagram showing a subsequent layer containing a traversable link 1822 for retrieving and installing a suitable video media player that is displayed in a web browser.

In some embodiments, the facility generates additional sets of layers to accommodate different browsers, different script interpretation engines in use on the recipient computer system, etc.

Figure 19:
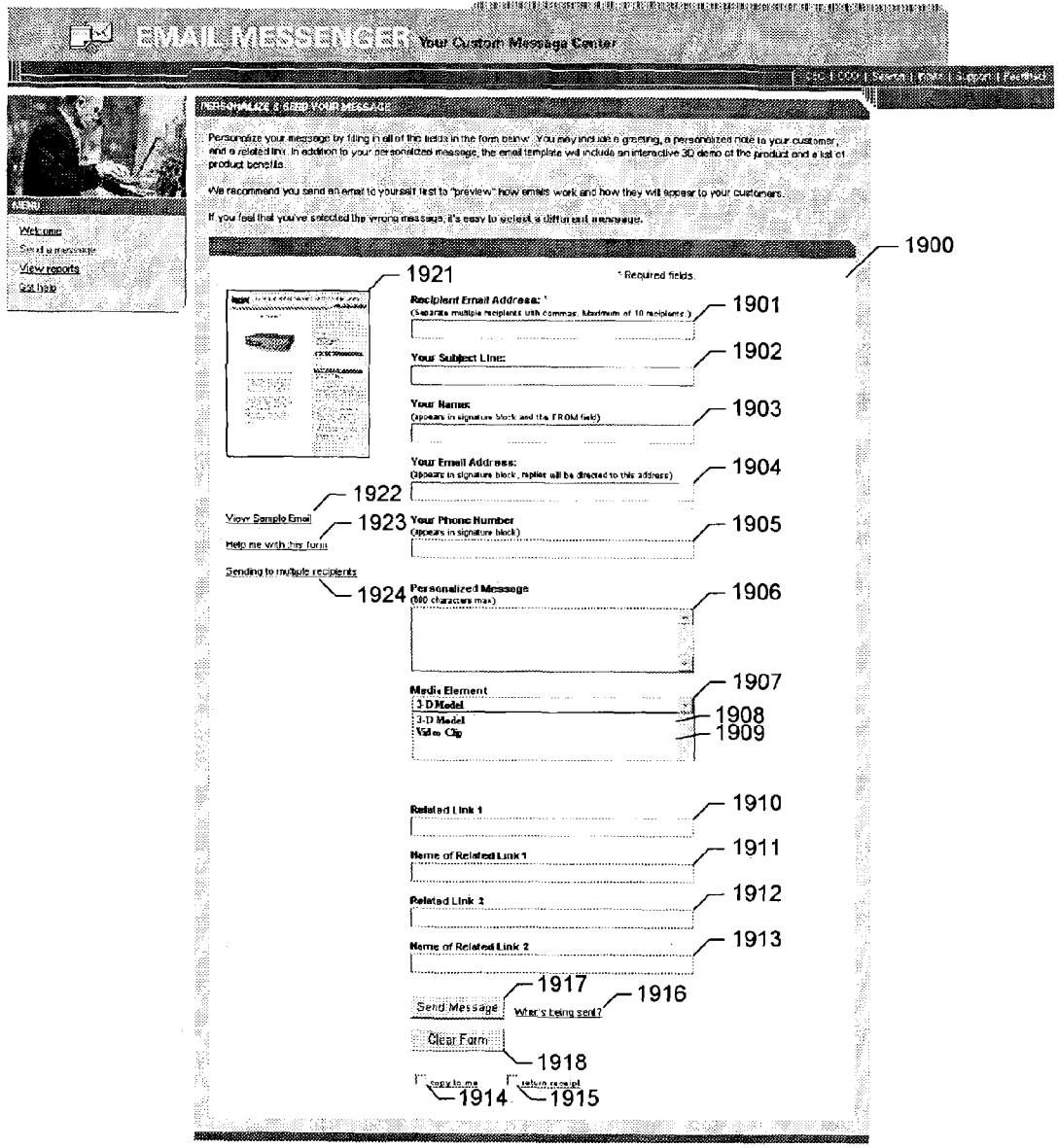
FIG. 19 is a display diagram showing a typical user interface provided by the facility to obtain information used to generate an instance of an adaptive media package.

FIG. 19 is a display diagram showing a typical user interface provided by the facility to obtain information used to generate an instance of an adaptive media package. The user interface includes a form 1900, which contains a number of controls that a user may use to input information used to generate an instance of an adaptive media package: a recipient email address field 1901, into which the user may enter one or more email addresses to which the adaptive media package instance is to be sent; a subject line field 1902, into which the user may enter a subject line for the email message conveying the adaptive media package instance; a sender name field 1903, into which the user may enter a name identifying the sender of the adaptive media package instance; a sender email address field 1904, into which the user may enter an email address for the sender of the adaptive media package instance; a sender phone number field 1905, into which the user may enter a phone number for the sender of the adaptive media package instance; a personalized message field 1906, into which the user may enter a text message to be included in the adaptive media package instance; a media element selection list box 1907 that the user may use to choose a media element for inclusion in the adaptive media package instance from among a 3-D model media element 1908 that may be rotated and explored by the recipient of the adaptive media package instance, and a video clip media element 1909 that may be viewed by the recipient of the adaptive media package instance; a related link 1 field 1910, into which the user can enter the URL of a first related web page, and a related link 1 name field 1911, into which the user may enter text for a link to the first related web page that will appear in the adaptive media package instance; a related link 2 field 1912 and a related link 2 name field 1913, into which the user can enter information used to create a link to a second related web page in the adaptive media package instance; a copy to me checkbox 1914 that the user may check in order to send a copy of the adaptive media package instance to the sender email address entered into sender email address field 1904; a return receipt checkbox 1915 that the user may check in order to request return receipts from the addressees of the adaptive media package instance; a link 1916 that the user may traverse in order to preview the adaptive media package instance; a send message button 1917 that the user may select in order to send the adaptive media package instance as specified; a clear form button 1918 the user may select in order to clear the data entry controls; a preview thumbnail 1921 that shows a preview of the adaptive media package at reduced size; a view sample email link 1922 that the user may traverse in order to view a sample email; a help me with this form link 1923 that the user can traverse in order to obtain additional instructions about using this user interface; and a sending to multiple recipients link 1924 that the user may traverse when addressing the adaptive media package to a number of recipients.

In some embodiments, the facility uses the data it has collected about a delivery and use of adaptive media packages to produce reports. Such reports may reflect such information as: the total number of different recipients that opened the IP message at least once (typically available from the web server); the total number of times the IP message was opened, including multiple opens from the same recipient (typically available from the web server); the number of times recipient traversed links in the message (typically available from the web server); the number of times a video stream was requested (typically available from the media server); the percentage of recipients who watched digital content sequences to completion (typically available from the media server); a breakdown of the number of recipients that watched a percentage of the digital content sequence within each of a number of blocks of percentages (typically available from the media server); the percentage of requests for a digital content sequence that occurred in each of a number of different time periods during the day (typically available from the media server); the percentage of recipients having bandwidth measured in each of a number of different ranges (typically available from the media server); the number of recipient computer systems running each of a number of different operating systems (typically available from the media server); the number of recipients in each of a number of different countries or locations (typically available from the media server); the number of recipients requesting the digital content sequence on each of the days of the week (typically available from the media server); and the length of time each recipient kept the adaptive media package IP message opened (typically available from the web server). Those skilled in the art will appreciate that some sets or supersets of this information may be included in a report.

Figure 20:
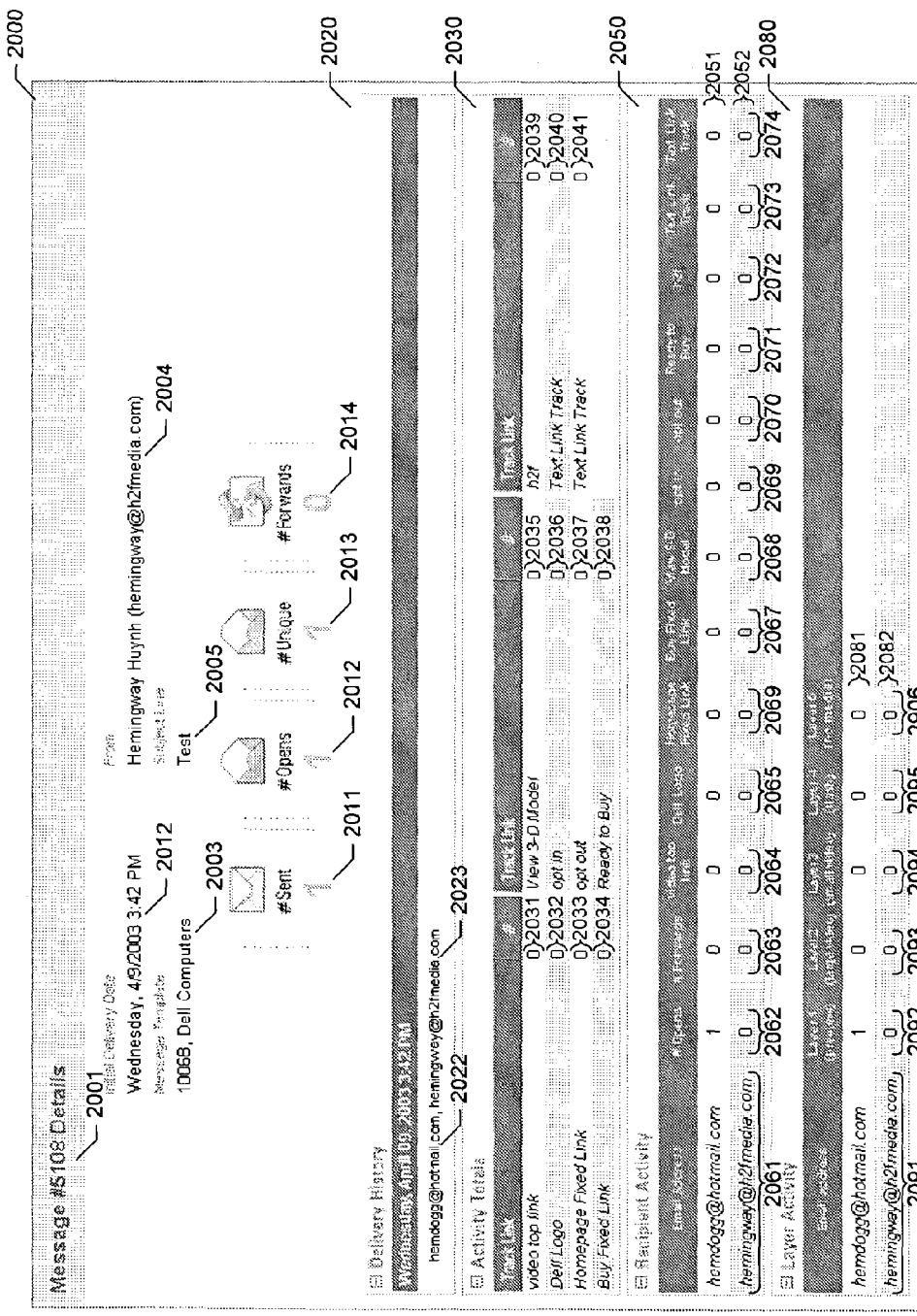
FIG. 20 is a display diagram showing a typical report generated by the facility.

FIG. 20 is a display diagram showing a typical report generated by the facility. The report 2000 includes details about the delivery and use of a particular message identified by message number 2001, such as a message conveying an adaptive media package. The information includes an initial delivery date 2002; information 2003 identifying a message template from which the message was generated; a sender address 2004; subject line text 2005; an indication 2011 of the number of different times the message has been sent; an indication 2012 of the number of times the message has been opened; an indication 2013 of the number of unique users that have opened the message; and an indication 2014 of the number of times the message has been forwarded to another address by a addressee.

The report includes a delivery history section 2020 containing information about each time the message has been sent. The delivery history section includes a subsection for each time the message has been sent. Each subsection includes a time stamp such as time stamp 2021 showing the date and time at which the message was sent, and a list of the email addresses such as email addresses 2022 and 2023 to which the message was sent.

The report includes an activity totals section 2030 containing information about the total number of times any of the addressees have performed each of a tracked group of actions relative to the message. The activity totals section identifies the total number of times each of a tracked group of actions 2031-2041 were performed by addressees of the message.

The report includes an addressee activity section 2050 containing information about the number of times each addressee has performed each of the tracked group of actions relative to the message. The addressee activity section contains a row for each addressee of the message. Each row contains the following information: the email address 2061 of the addressee; an indication 2062 of the number of times the addressee has opened the message; an indication 2063 of the number of times the addressee has forwarded the message; an indication 2064 of the number of times the addressee has traversed a video link in the message; an indication 2065 of the number of times the addressee has traversed a logo link in the message; an indication 2066 of the number of the times the addressee has traversed a home page link; an indication 2067 of the number of times that the addressee has traversed a buy link; an indication 2068 of the number of times the addressee has traversed a link to view a 3-D model; an indication 2069 of the number of times the addressee has traversed an opt in link; an indication 2070 of the number of times that the addressee has traversed an opt out link; an indication 2071 of the number of times the addressee has traversed a ready to buy link; an indication 2072 of the number of times the addressee has traversed a h2f link; an indication 2073 of the number of times the addressee has traversed a first custom link; an indication 2074 of the number of times the addressee has traversed a second custom link.

The report includes a layer activity section 2080 containing information about the number of times each addressee has viewed each layer of the message. The layer activity section contains a row for each addressee of the message. Each row contains the email address 2091 of the addressee; an indication 2092 of the number of times the addressee viewed a first, preview layer of the message; an indication 2093 of the number of times the addressee viewed a second, large video layer of the message; an indication 2094 of the number of times the addressee viewed a third, small video layer of the message; an indication 2095 of the number of times the addressee viewed a fourth, flash layer of the message; and an indication 2096 of the number of times the addressee viewed a fifth layer of the message containing no media element.

It will be appreciated by those skilled in the art that the above-described facility may be straightforwardly adapted or extended in various ways. For example, the facility may be used to deliver various kinds of messages other than direct email messages, and may adapt various types of content other than digital content. While the foregoing description makes reference to preferred embodiments, the scope of the invention is defined solely by the claims that follow and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

We claim:

1. One or more non-transitory computer-readable media containing instructions stored thereon, that, in response to execution by a computing device, cause the computing device to perform operations including:
   generating a message, the generated message including:
      a first version of a media message comprising one or more content elements;
      at least a portion of first logic configured to execute in response to display of the first version of the media message on a receiving computer system to cause the receiving computer system to test content-rendering capabilities of the receiving computer system; and
      at least a portion of second logic configured to display one or more content elements of a second version of the media message on the receiving computer system as replacements for one or more elements of the first version of the media message based at least in part on results of testing content-rendering capabilities of the receiving computer system.

2. The computer-readable media of claim 1, wherein the operations further include transmitting the message to one or more computer systems via a communication network.

3. The computer-readable media of claim 2, wherein the second logic is further configured to cause the one or more content elements of the second version of the media message to be transmitted to the receiving computer system separately from transmission of the generated message.

4. The computer-readable media of claim 3, wherein the second logic is further configured to cause the one or more content elements of the second version of the media message to be transmitted to the receiving computer system in a form customized for an addressee of the generated message.

5. The computer-readable media of claim 1, wherein the first version of the media message comprises a link that, when de-referenced during display of the first version of the media message on the receiving computer system, causes the first and second logic to be executed by the receiving computer system.

6. The computer-readable media of claim 1, wherein the generated message contains the first and second logic.

7. The computer-readable media of claim 1, wherein the generated message includes referencing logic to a portion of the first and second logic.

8. The computer-readable media of claim 1, wherein the first logic comprises a script configured to be executed by the receiving computer system to test the content-rendering capabilities of the receiving computer system.

9. A computer-implemented method for generating an adaptive message, the method comprising:
   generating, by a computing device, one or more messages, wherein individual messages of the one or more generated messages include:
      a first version of a media message comprising one or more content elements;
      at least a portion of first logic configured to execute in response to display of the first version of the media message on a receiving computer system to cause the receiving computer system to test content-rendering capabilities of the receiving computer system; and
      at least a portion of second logic configured to display one or more content elements of a second version of the media message on the receiving computer system as replacements for one or more elements of the first version of the media message based at least in part on results of testing content-rendering capabilities of the receiving computer system.

10. The method of claim 9, further comprising transmitting, by the computing device, the message to one or more computer systems.

11. The method of claim 10, wherein generating the one or more messages comprises generating the one or more messages such that the second logic is further configured to cause the one or more content elements of the second version of the media message to be transmitted to the receiving computer system separately from transmission of the respective message.

12. The method of claim 11, wherein generating the one or more messages comprises generating the one or more messages such that the second logic is further configured to cause the one or more content elements of the second version of the media message to be transmitted to the receiving computer system in a form customized for an addressee of the respective message.

13. The method of claim 9, wherein generating the one or more messages comprises generating the one or more messages such that the first version of the media message comprises a link that, when de-referenced during display of the first version of the media message on the receiving computer system, causes the first and second logic to be executed by the receiving computer system.

14. The method of claim 9, wherein generating the one or more messages comprises generating the one or more messages such that the included logic is contained in the respective one or more messages.

15. The method of claim 9, wherein generating the one or more messages comprises generating the one or more messages to include logic referencing a portion of the first and second logic.

16. The method of claim 9, wherein generating the one or more messages comprises generating the one or more messages such that the first logic comprises a script configured to be executed by the receiving computer system to test said content-rendering capabilities of the receiving computer system.

17. A computer-implemented method for displaying an adaptive message, the method comprising:
   receiving, by a computing device, a first version of a media message, the first version comprising one or more content elements;
   displaying, by the computing device, one or more of the content elements of the first version of the media message; and
   in response to the displaying the one or more of the content elements of the first version of the media message:
      testing, by the computing device, content-rendering capabilities of the computing device;
      selecting, by the computing device, a second version of the media message to display based upon the results of the testing; and
      displaying, by the computing device, one or more content elements of the second version of the media message in substitution for one or more elements of the first version of the media message.

18. The method of claim 17, wherein receiving a first version of a media message, further comprises receiving, by the computing device, logic that, when executed by the computing device, causes the computing device to perform the testing selecting and displaying.

19. The method of claim 17, further comprising receiving the one or more content elements of the second version of the media message separately from receipt of the first version of the media message.

20. The method of claim 17, wherein the testing, selecting, and displaying are performed in response to a link being dereferenced by the computing device during display of the one or more of the content elements of the first version of the media message.

* * * * *